US006724916B1

United States Patent
Shyu

(10) Patent No.: US 6,724,916 B1
(45) Date of Patent: Apr. 20, 2004

(54) COMPOSITE HOUGH TRANSFORM FOR MULTITARGET MULTISENSOR TRACKING

(75) Inventor: Haw-Jye Shyu, Columbia, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/477,811

(22) Filed: Jan. 5, 2000

(51) Int. Cl.[7] ................................................. G06K 9/00
(52) U.S. Cl. ....................................................... 382/103
(58) Field of Search ......................................... 382/103

(56) References Cited

U.S. PATENT DOCUMENTS

| | | | |
|---|---|---|---|
| 5,798,458 A | * | 8/1998 | Monroe ........................ 73/587 |
| 5,838,816 A | * | 11/1998 | Holmberg ..................... 382/157 |
| 5,892,855 A | * | 4/1999 | Kakinami et al. ........... 382/291 |
| 6,043,867 A | * | 3/2000 | Saban ......................... 356/5.01 |

OTHER PUBLICATIONS

A Hough transform based multisensor, multitarget track initiation technique; Yankowich, S.W.; Farooq, M.; Decision and Control, 1997., Proceedings of the 36th IEEE Conference on , vol.: 5 , 1997 Page(s): 5018 –2023.*
Applying morphological filters to acoustic broadband correlograms; Haw–Jye Shyu; Systems, Man, and Cybernetics, 1997. Computational Cybernetics and Simulation., 1997 IEEE International Conference on , vol.: 5 , 1997 Page(s): 4182–4187.*
Performance of detect–on–track in a high shipping environment; Lee, Y.P.; Haw–Jye Shyu; OCEANS '96. MTS/IEEE. Prospects for the 21st Century. Conference Proceedings, vol.: 3, 1996 Page(s): 1313–1318.*
Shyu; Multitarget–Multisensor Tracking Via Composite Hough Transform; NRL/FR/5580–99–9905; FEO 1999.
Gramann; ABF Algorithms Implemented at ARL:UT; ARL–TR–92–7; U. of Texas Appl. Res. Lab., May 1992.
Machell; Algorithms for Broadband Processing and Display; TL–EV–90–08, Univ. of Texas Appl. Res. Lab., Mar. 1990.
Brannon et al.; Design and Evaluation of Track–Before–Detect Processing for Acoustic Broadband Data: Tech. RDT. No. 1786, N CCOSC, RDT&E Div. US Univ. San Diego, CA Jan. 1997.
Stevens et al.; Application of the Hough Transform to Acoustic Broadband Correlation for Passive Detection and Location; NRL RPT. NRL/MR 15580–92–7182, Jan. 1993.
Slasky; On the Hough Technique for Curve Detection; IEEE Trans. Computer vol. 27, No. 10, pp. 923–926; 1918.
Singer et al; Computer Control of Multiple Site Track Correlation; Automatica, vol. 7, pp. 455–464; 1971.

\* cited by examiner

Primary Examiner—Leo Boudreau
Assistant Examiner—Hussein Akhavannik
(74) Attorney, Agent, or Firm—John J. Karasek; John Gladstone Mills

(57) ABSTRACT

A sensor system utilizing a Composite Hough Transform (CHT) operates on multiple corresponding broadband correlograms produced at two neighboring dual-channel sensor systems. A broadband signal source can generate one correlation trace on each of the correlograms. Since these correlation traces are produced by the same signal source, they are constrained by a set of geometric relationships. By fully exploiting this set of constraints, the CHT fuses sensor data from multiple dual-channel sensor systems for target detection and track parameter estimation. The dual-channel system can be (a) a split-array system; a linear array split into two subarrays with each subarray corresponding to one of the channels, (b) two neighboring linear arrays, or (c) two neighboring individual hydrophones. The CHT operates with two neighboring linear subarrays. One of the sensor arrays is chosen as the primary array; it is used to originate the different track hypotheses for the signal source. Its corresponding broadband correlogram is referred to as the primary correlogram. The other sensor array is the secondary array, and the corresponding broadband correlogram is referred to as the secondary correlogram. The CHT exploits the geometric relationships between the primary and secondary array.

6 Claims, 25 Drawing Sheets

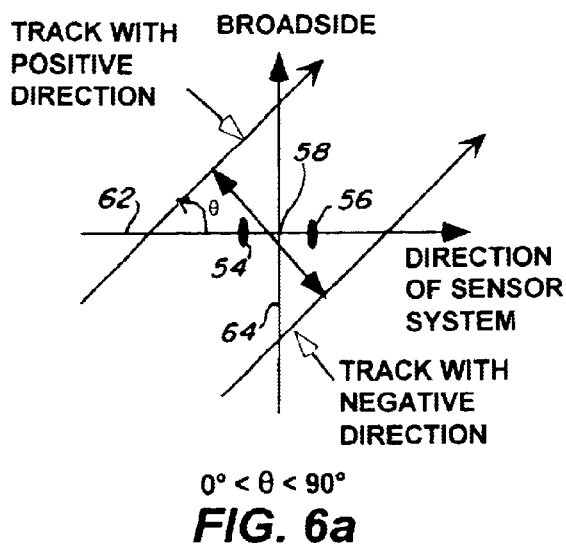
FIG. 6a $0° < \theta < 90°$
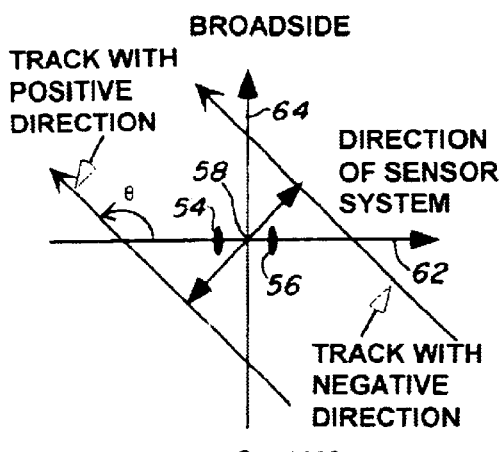
FIG. 6b $90° < \theta < 180°$
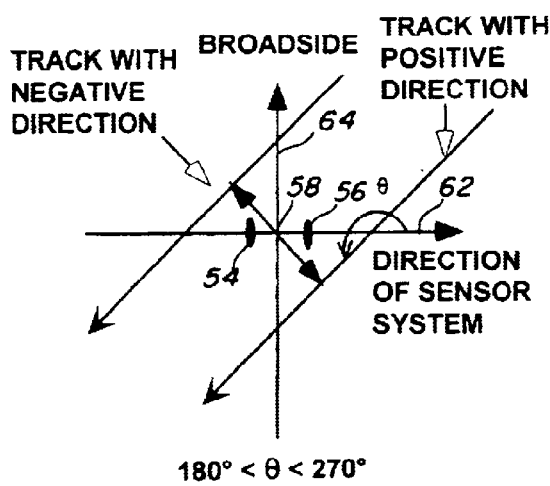
FIG. 6c $180° < \theta < 270°$
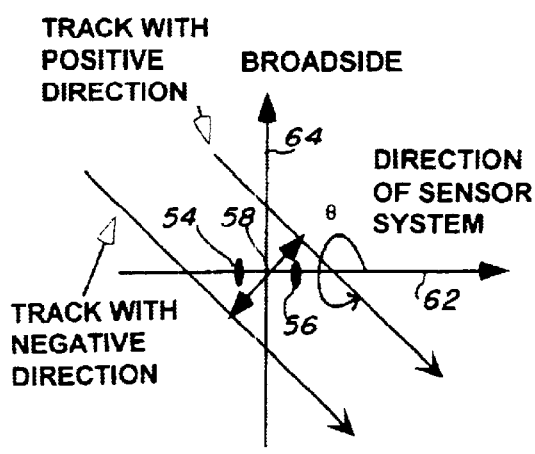
FIG. 6d $270° < \theta < 360°$

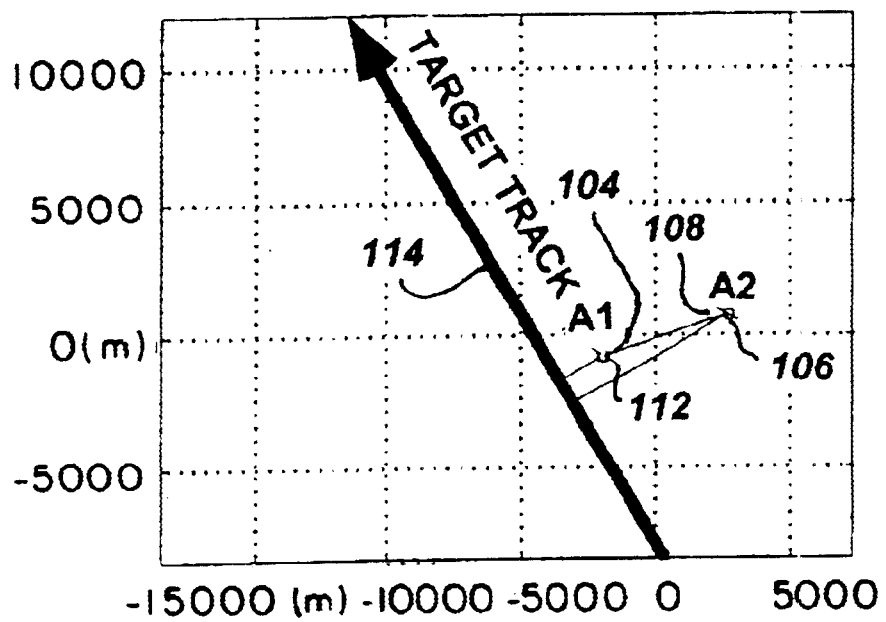
FIG. 11a
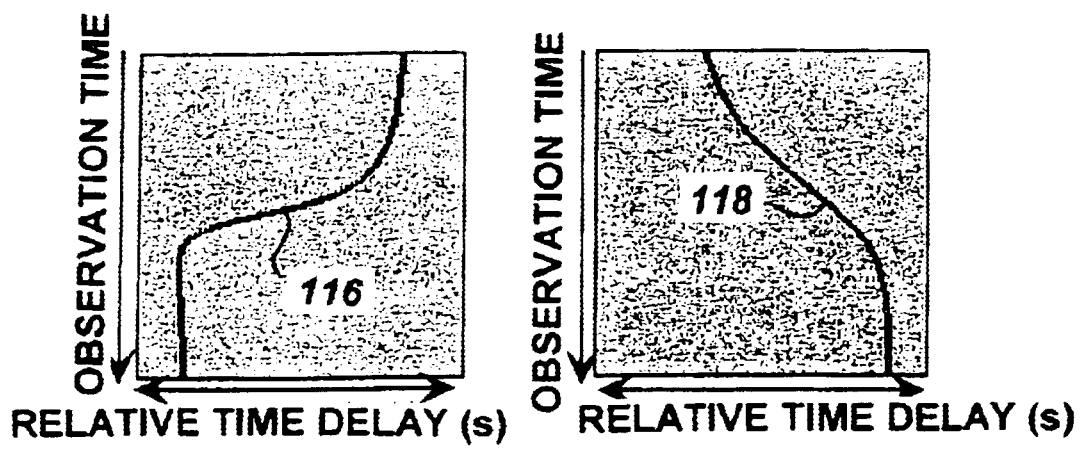
FIG. 11b  FIG. 11c

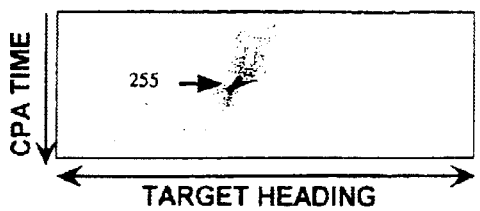
FIG. 12a
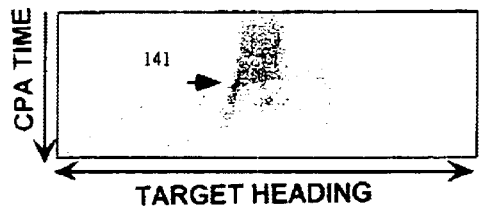
FIG. 12b
FIG. 13a
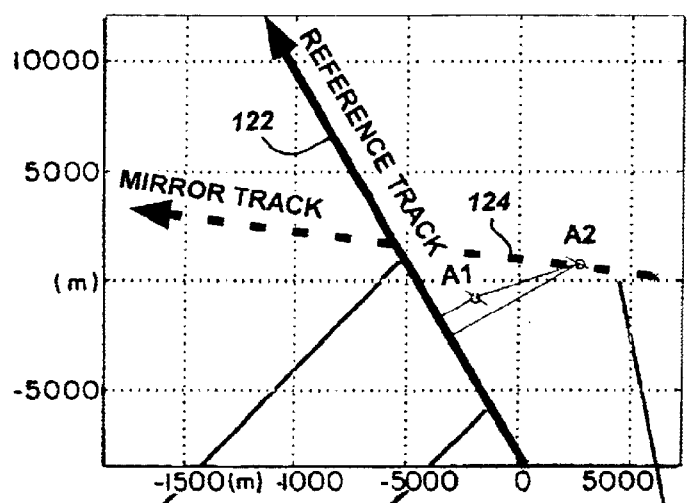
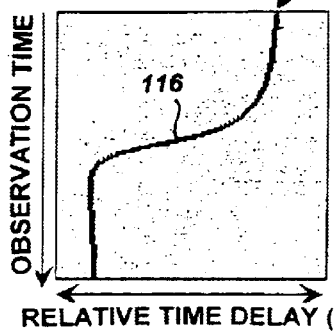
FIG. 13b
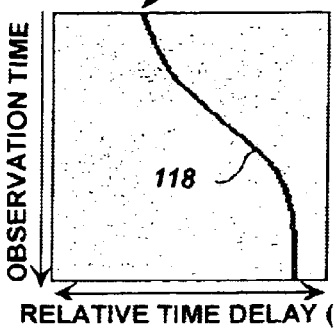
FIG. 13c
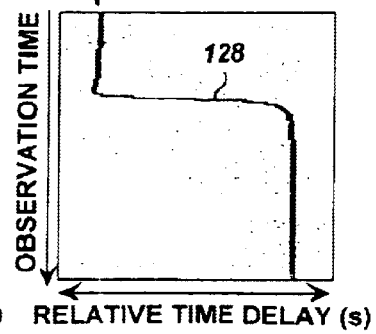
FIG. 13d

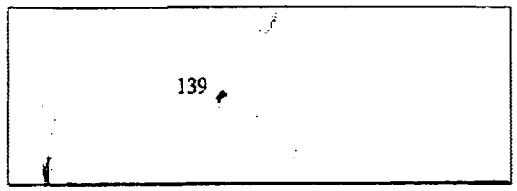
FIG. 14a
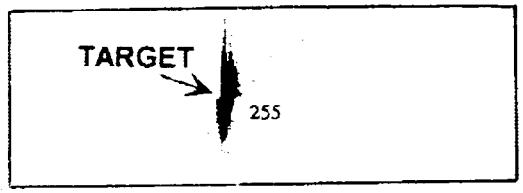
FIG. 14b
FIG. 15a
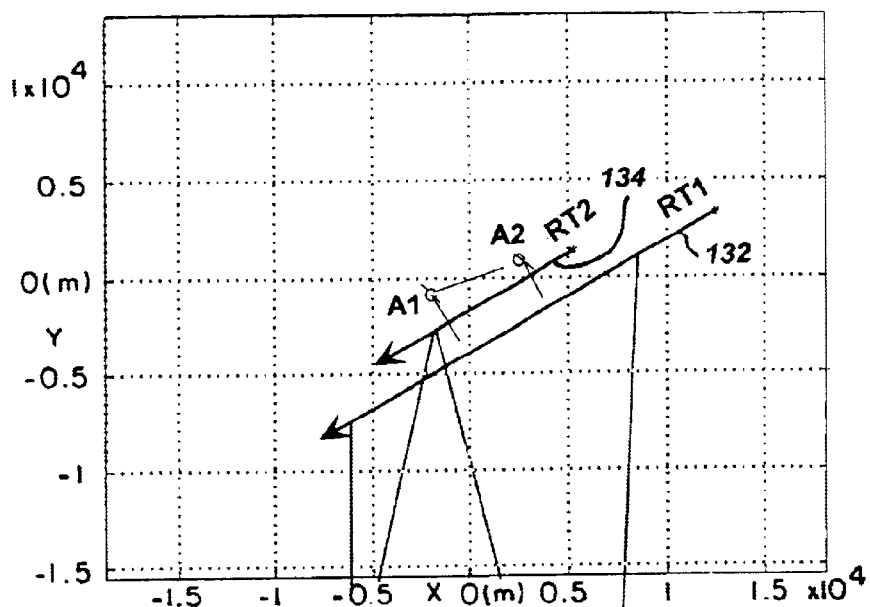
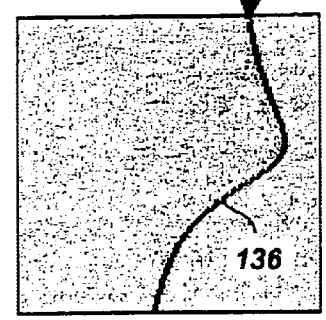
FIG. 15b
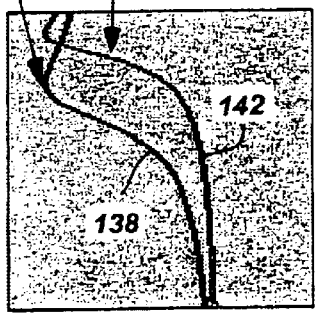
FIG. 15c

COMPOSITE HOUGH TRANSFORM FOR MULTITARGET MULTISENSOR TRACKING

BACKGROUND OF THE INVENTION

1. Field of the Invention

This invention pertains generally to target tracking of underwater objects and more particularly to the tracking of multiple targets using distributed acoustic linear sensor arrays utilizing spatial matched filtering techniques that can combine different image features from different image data in a coherent manner.

2. Description of the Related Art

The delay curve Hough transform (DCHT) was developed based on the paradigm of track-before-detect and applied to image data collected from a single sensor array for target tracking and track parameter estimations. Two different kinds of target tracking ambiguities are associated with a single sensor array using DCHT. See, Stevens et al., APPLICATION OF THE HOUGH TRANSFORM TO ACOUSTIC BROADBAND CORRELATIONS FOR PASSIVE DETECTION AND LOCATION; NRL Mem. Rpt. NRL/MR/5580-92-7182, January 1993. One of them is the mirror track ambiguity and the other is the delay curve parameter ambiguity. It is well known that multiple sensor systems are required to address these problems.

The DCHT is closely related to techniques of classical passive dual-channel localization. It uses a pattern recognition technique, the Hough transform, to operate on a set of continuous snapshots of cross-correlation, i.e., broadband correlation, between the two channels and perform target detection and target track parameter estimation. A broadband signal source with a constant speed, moving along a linear track, can generate a correlation trace in a broadband correlogram. This correlation trace can be described by an analytic equation, called the delay curve, determined by the track direction, the closest point of approach (CPA) time $t_o$, and the ration between the closest point of approach horizontal distance D and speed v. Taking advantage of this delay curve, the DCHT hypothesizes a group of potential delay curves; accumulates evidence for each delay curve by summing (integrating) the pixel values along each hypothesized delay curve; stores accumulated pixel values in the parameter space (also known as the Hough Space); and thresholds the accumulated pixel values to detect the delay curves. Since the detection is done in the parameter space, the parameters of the image feature are determined by the location of the peak.

When using multiple sensor systems, multiple targets generate multiple traces on different recordings produced from different sensor systems. The difficulties encountered using multiple sensors are well-known issues of data association, such as measure-to-measure association—how the target traces are formed and how they relate to the target's movement—; measurement-to-track association—which trace should be followed when target traces cross each other—; and track-to-track association—which target traces in different recording are associated with the same target. Different tracks with the same CPA time $t_o$, track direction θ, and v/D ratio but different speeds v and CPA horizontal distances D can generate the same delay curve, and hence, the DCHT cannot differentiate among such tracks. Also, given a linear sensor array, for any track, a mirror track exists that is the mirror reflection of the original track with respect to the linear sensor array. Due to the inherent geometric symmetry in a linear array, these two tracks produce the same delay curve in the broadband correlogram; hence, the DCHT cannot distinguish these two tracks.

The DCHT as a constant-speed signal source moves along a linear track in the neighborhood of a dual-sensor system, the time delay between the signal arriving at the two sensors follows an analytic equation called the delay curve. The two sensor system can consist of two omnidirectional hydrophones, two halves of a split array, or two individual arrays. Assuming a plane wavefront arrival at two sensors at the same depth, Sevens et al., supra, showed that the equation of the delay curve is given by:

$$\tau(t) = \tau_{max} \frac{\left(\frac{v}{D}(t-t_o)\right)\cos\theta - \sin\theta}{\sqrt{1 + \left(\frac{v}{D}(t-t_o)\right)^2 + \left(\frac{h}{D}\right)^2}} \quad (1)$$

where τ(t) is relative time delay between the two received signals at time t; $\tau_{max}$ is the length of the baseline divided by the signal propagation speed; $t_o$ is CPA time; D is horizontal distance at CPA from the signal source to the midpoint of the sensor pair; h is depth difference between the signal source and the sensors; v is the signal source speed; θ is the track direction defined by the right-turn rule convention; and t is observation time.

From the analytic equation for the delay curve, Eq. (1), the delay curve Hough transformation can be defined mathematically as $$f\left(\frac{v}{D}, \theta, t_o, \frac{h}{D}\right) = \frac{1}{N}\int\int F(x,y)\delta(\tau(x,y))dxdy \quad (2)$$

where f(v/D, θ, $t_o$, h/D) is the output of the DCHT; F(x,y) is pixel value in the correlogram at location (x,y); δ( ) is Dirac-delta function restricting the integration to the delay curve; N is the total number of pixels in the integration; x is horizontal offset in correlogram, and y is vertical offset in correlogram.

The target track is a function of five track parameters: v, θ, h, D, and $t_o$. The delay curve is a function of the four delay parameters: θ, $t_o$, and the ratios v/D and h/D. The DCHT is defined over the set of delay curves parameters, and thus the parameter space of the DCHT has only four dimensions: θ, $t_o$, v/D, and h/D. Each dimension is independently sampled over an appropriate range for the tracks of interest. For simplification, the depth factor, h/D, is assumed to be a constant.

As previously discussed, two target-tracking problems are associated with a single linear array. The first problem is the so-called delay curve parameter ambiguity different target tracks with different track parameters, v, D, θ, $t_o$, but having the same delay curve parameters, v/D, θ, $t_o$, will produce the same delay curve in the correlogram, hence are indistinguishable in the correlogram. The second problem is the mirror effect. For every individual target track there exists a mirror track; because of geometrical symmetry, the target track and its mirror track are indistinguishable in the correlogram since they always have the same time delay to the two sensors.

FIGS. 1a and 1b shows an example of the delay curve parameter ambiguity. FIG. 1a shows the target-sensor geometry, and FIG. 1b shows its corresponding delay curve. Even though the target track 11 is a straight line, the delay curve 13 in the correlogram veers sharply. Two parallel dashed lines 15 and 17 representing tow different target tracks are also shown in FIG. 1a; these dashed track lines 15 and 17 indicate different target tracks but with the same delay curve parameters; same direction, same CPA lines, the same v/D ratio. To have the same v/D ratio, a target track with a longer CPA distance must have a higher target speed and vice versa. Because their delay curve parameters are identical, these different tracks generate exactly the same delay curve in the correlogram. Without additional information, the DCHT cannot differentiate between these tracks.

FIG. 2 shows the mirror effect; two target tracks are shown. One is the reference track 19; the other one is the mirror reflection 21 of the reference track 19. Although the mirror track 21 is geometrically distinct from the reference track 19, the linear array cannot differentiate between the two because the correlation trace generated by the mirror track 21 is exactly the same as that generated by the reference track 19. It is useful to note that a track and its mirror track will have opposite signs (positive and negative) with respect to the right-turn rule for determining track direction, discussed above.

From the foregoing discussion, both the target track 11 and delay 13 are characterized by the track parameters v, D, θ, and $t_o$. Using the DCHT, the delay curve 13 can be detected from the broadband correlogram, and the corresponding parameters can be extracted. The target track 11 an be reconstructed, but with some degree of ambiguity. The delay curve 13 equation, Eq. (1), can be viewed as a mapping between the target track 11 space and the delay curve 13 space. This mapping, however, is not a one-on-one mapping. Instead, because of the delay curve 13 parameter ambiguity and the mirror effect, it may be a many-to-one mapping. The key problem is how to resolve this many-to-one mapping to recover the actual target track from the correlation trace in the correlograms. The answer lies in using multiple arrays.

SUMMARY OF THE INVENTION

The object of this invention is provide a filtering technique that can combine different image features from different image data in a coherent manner when tracking multiple targets using distributed linear acoustic linear sensor arrays.

Another object of this invention is to provide for multitarget-multisensor tracking utilizing real data sets from a shallow-water environment.

Another object of this invention is to provide a device that does not require an initial guess of the number and state of the targets, and can be applied to multitarget-multisensor tracking without an initial guess, unlike conventional Kalman-filter based techniques.

Another object of this invention is to exploit the geometric properties of multiple arrays and perform data fusion for multiple sensor arrays, resolving ambiguity due to the mirror effect and the delay curve parameter ambiguity associated with a single array, and allowing the reconstruction of target tracks.

Another object of this invention is to enable one to perform noncoherent integration from sweep to sweep, from delay-time-cell to delay-time-cell, and from array to array while providing a processing gain over a single array.

Another object of this invention is to provide for increased processing gain and to facilitate sensor systems configuration and management for multiple array systems.

Another object of this invention is to suppress sidelobes and obtain a sharper peak and improve the accuracy of the parameter estimation with sensor systems.

Another object of the invention is to provide a device that reduces a large number of calculations to search over the full space.

This and other objectives are achieved by the use of a Composite Hough Transform (CHT) in a sensor system. The CHT operates on two or more corresponding broadband correlograms produced at two neighboring dual-channel sensor systems. A broadband signal source can generate one correlation trace on each of the correlograms. Since these correlation traces are produced by the same signal source, they are constrained by a set of geometric relationships. By fully exploiting this set of constraints, the CHT fuses sensor data from multiple dual-channel sensor systems for target detection and track parameter estimation. The dual-channel system is a split-array system; a linear array split into two subarrays with each subarray corresponding to one of the channels. The CHT operates with two neighboring linear subarrays. One of the sensor arrays is chosen as the primary array; it is used to originate the different track hypotheses for the signal source. Its corresponding broadband correlogram is referred to as the primary correlogram. The other sensor array is the secondary array, and the corresponding broadband correlogram is referred to as the secondary correlogram. The CHT exploits the geometric relationships between the primary and secondary array.

BRIEF DESCRIPTION OF THE DRAWINGS

FIG. 1b shows a corresponding delay curve for the target-sensor geometry shown in FIG. 1a.

FIG. 6a shows the right-turn-rule convention for the target direction for 0°<θ<90°.

FIG. 6b shows the right-turn-rule convention for the target direction for 90°<θ<180°.

FIG. 6c shows the right-turn-rule convention for the target direction for 180°<θ<270°.

FIG. 6d shows the right-turn-rule convention for the target direction for 270°<θ<360°.

FIG. 11a shows target-sensor geometry for basic behavior of Composite Hough Transform.

FIG. 11b shows a simulated correlogram from a primary array $A_1$.

FIG. 11c shows a simulated correlogram from a secondary array $A_2$.

FIG. 12a shows the Reference Track Composite Hough Space produced by ACHT for v=9.0 kt and $D_1$=1.0 nmi.

FIG. 12b shows the Mirror Track Composite Hough Space produced by ACHT for v=9.0 kt and $D_1$=1.0 nmi.

FIG. 13a shows the target sensor geometry showing how the Composite Hough Transform resolves the mirror effect FIG. 13b shows the simulated primary correlogram from array $A_1$ with correlation trace due to the target track.

FIG. 13c shows the simulated secondary correlogram from array $A_2$ with correlation trace due to the target track.

FIG. 13d shows the simulated secondary correlogram from array $A_2$ with correlation trace due to the mirror track.

FIG. 14a shows the Composite Hough Space produced by the ACHT, using FIG. 13a as the primary correlogram.

FIG. 14b shows the Composite Hough Space produced by the MCHT, using FIG. 13d as the secondary correlogram.

FIG. 15a shows the target-sensor geometry for a scenario of delay curve parameter ambiguity.

FIG. 15b shows the primary correlogram, with only one correlation trace.

FIG. 15c shows the secondary correlogram, with two correlation traces produced by the two tracks.

FIG. 17c shows the slice of RTCHS for a speed of 9.0 kts and $D_1$ of 2.0 nmi.

FIG. 17d shows the slice of MTCHS for a speed of 9.0 kts and $D_1$ of 2.0 nmi.

DETAILED DESCRIPTION OF THE INVENTION

An extension of Delay Curve Hough Transform (DCHT) is the Composite Hough Transform (CHT). Unlike the DCHT operating on a broadband correlogram produced by a single dual-channel sensor system, the CHT operates on multiple corresponding broadband correlograms produced at multiple neighboring dual-channel sensor systems. A broadband signal source can generate one correlation trace on each of the correlograms. Since these correlation traces are produced by the same signal source, they are constrained by a set of geometric relationships. By fully exploiting this set of constraints, the CHT fuses sensor data from multiple dual-channel sensor systems for target detection and track parameter estimation. The dual-channel system can bea split-array system; a linear array split into two subarrays with each subarray corresponding to one of the channels or two neighboring linear subarrays. One of the sensor arrays is chosen as the primary array; it is used to originate the different track hypotheses for the signal source. Its corresponding broadband correlogram is referred to as the primary correlogram. The other sensor array is the secondary array, and the corresponding broadband correlogram is referred to as the secondary correlogram.

The CHT exploits the geometric relationships between the primary and secondary array. Similar to the DCHT, the CHT hypothesizes a track, called the reference track, relative to the primary array; calculates the associated delay curve in the primary correlogram; derives, based on the geometric constraints, the delay curve for the track on the secondary correlogram; accumulates evidence for the track by simultaneously summing (integrating) the pixel values along the appropriate delay curves in the primary and the secondary correlograms; stores the accumulated pixel values in the composite Hough space; and thresholds the accumulated pixel values to detect the track.

Since the detection is done in the parameter space, the parameters of the delay curves are determined by the location of the peak. By using two correlograms, the CHT resolves the target tracking ambiguities associated with a single linear sensor array and provides another 3 dB processing gain over the DCHT.

Figure 1A:
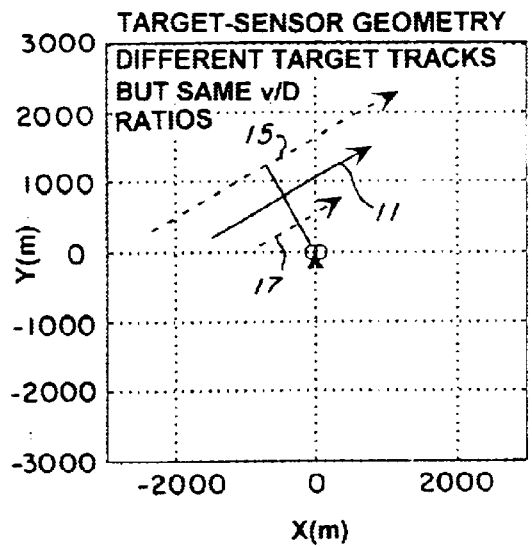
FIG. 1a shows a target-sensor geometry.
Figure 1B:
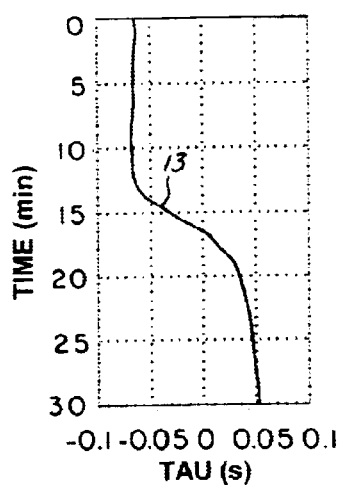
Figure 2:
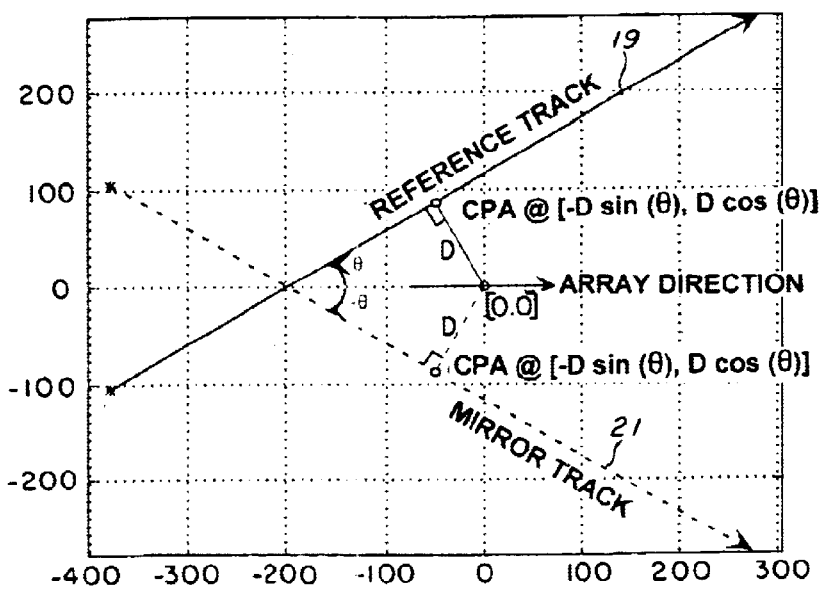
FIG. 2 shows the mirror effect.
Figures 3A, 3B:
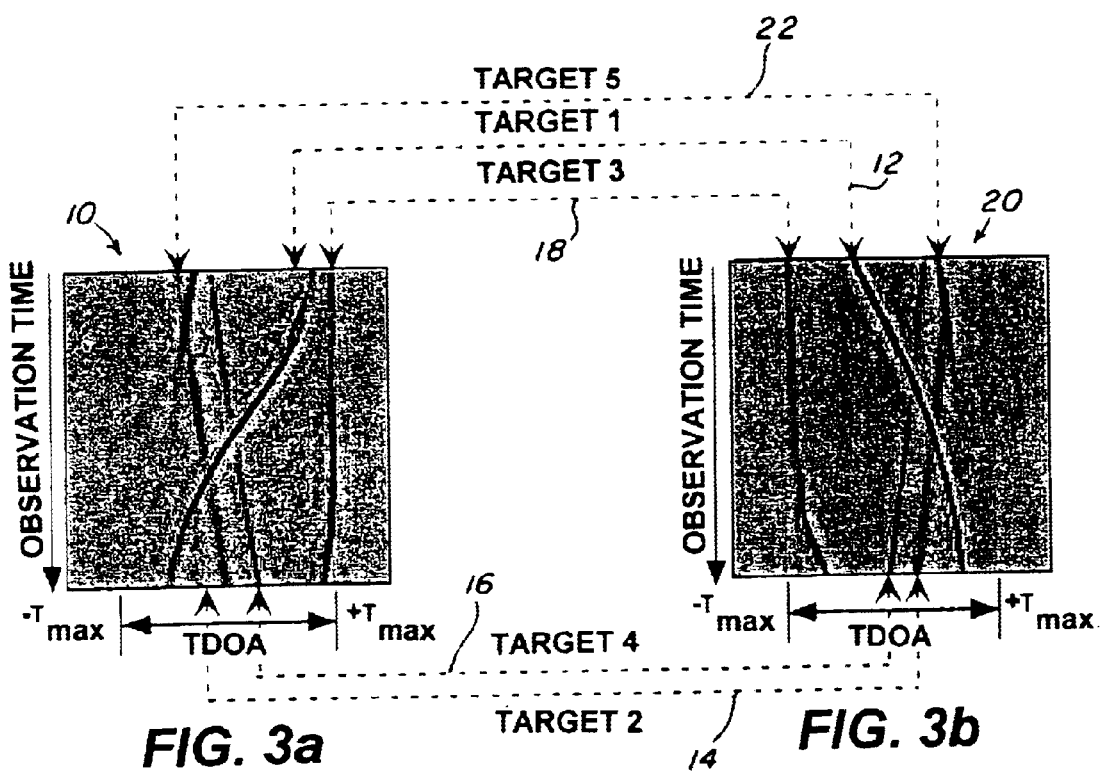
FIG. 3a shows a broadband correlogram array A of two neighboring sensor arrays.
FIG. 3b shows a broadband correlogram array B of two neighboring sensor arrays.

FIGS. 3a and 3b shows two typical real data broadband correlograms from two neighboring arrays; a primary array, FIG. 3a, and a secondary array, FIG. 3b. The vertical axis is the observation time. The horizontal axis is the relative time delay, time difference of arrival (TDOA), of a signal at two sensors. Five different correlation traces are shown in each of the correlograms; each correlation trace corresponds to a target. In FIG. 3a, target 1 12 has a high change rate of bearing and moves from maximum TDOA to minimum TDOA; targets 2 14 and 4 16 move from minimum TDOA towards zero TDOA; target 3 18 maintains the maximum TDOA for most of the observation period with an apparent course change near the bottom of the figure; and target 5 22 appears only in the beginning of the observation period. In this case the secondary correlogram 20, is almost the mirror reflection of the primary correlogram 10, with the exception that the course change for target 3 18 is more significant. This behavior indicates an apparent one-to-one correspondence between the correlation traces on the two broadband correlograms. In general, the primary 10 and secondary 20 correlograms do not appear as near-mirror reflection of each other because of differences in array orientation and target tracks.

Using two different broadband correlograms to do multiple target tracking involves data association. Particularly, the three levels of data association previously discussed in relation to Kalman-filter based techniques to be considered. These types of issues are common to the problem of multitarget-multisensor tracking. The first treatment of this type of problem was discussed in Singer et al., COMPUTER CONTROL OF MULTIPLE SITE TRACK CORRELATION; *Automatica*, Vol. 7, pp. 455–464, 1971. They assumed that a Kalman filter estimated the target's state, such as the target's position and speed. Assuming two sites, each with its own sensor and data processor (Kalman filter), the difference of the two estimates was tested for the hypothesis that the underlying states were the same.

Conventional multitarget-multisensor tracking techniques dissect the target-tracking problem into three stages: detection, track formation, and track maintenance. Typically, a predetermined threshold is used in the stage of detection; thresholding in this stage can potentially discard some important target information. Instead of discarding target signal power in the detection stage, the CHT uses the geometric constraints relating the target and sensor geometry to a track-before-detection approach that integrates the signal power to accumulate a confidence level as part of the tracking process: thresholding is not done until the last stage.

Figure 4A:
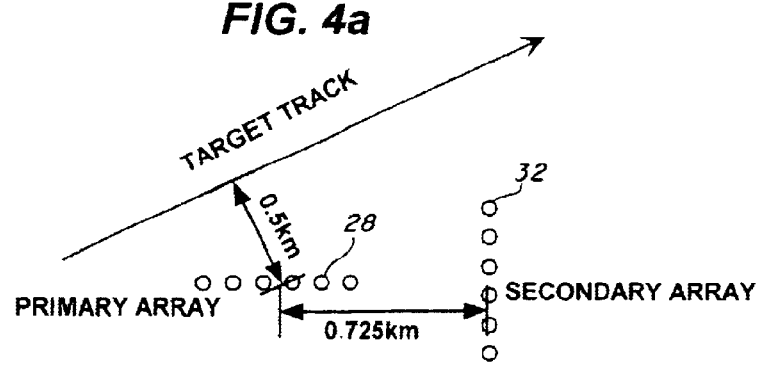
FIG. 4a shows a sensor-target geometry for use with a composite Hough transform.
Figure 4B:
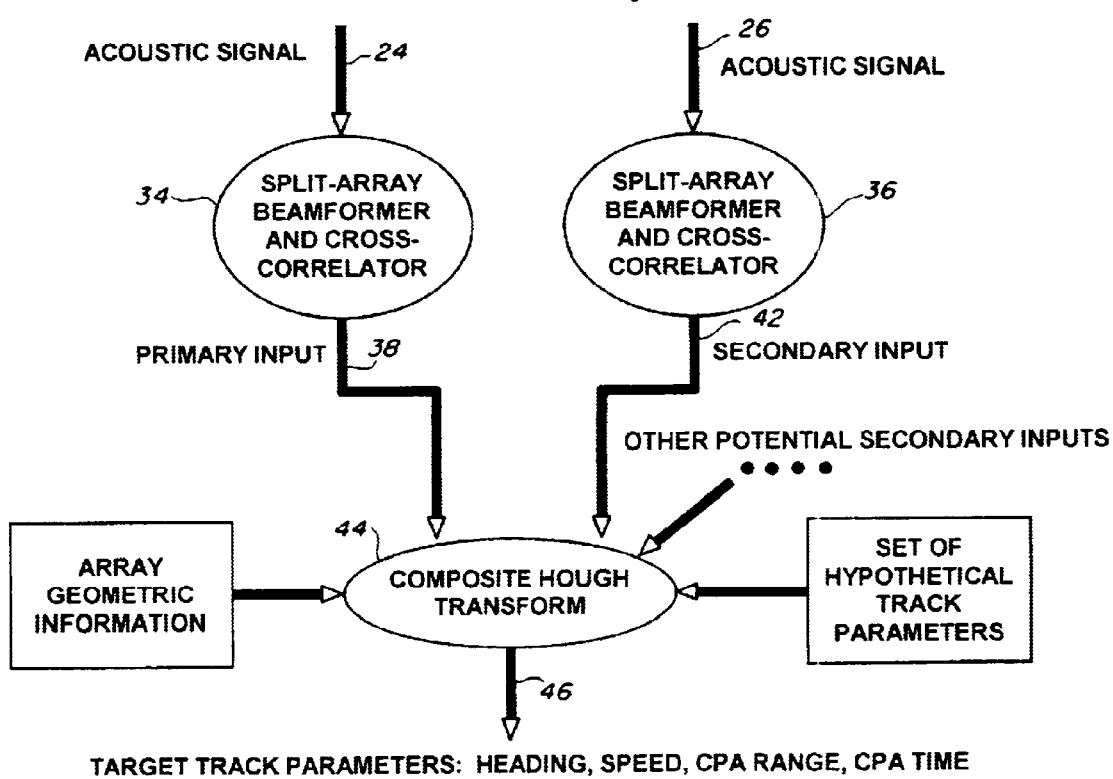
FIG. 4b shows a system diagram for a composite Hough transform.
Figure 5:
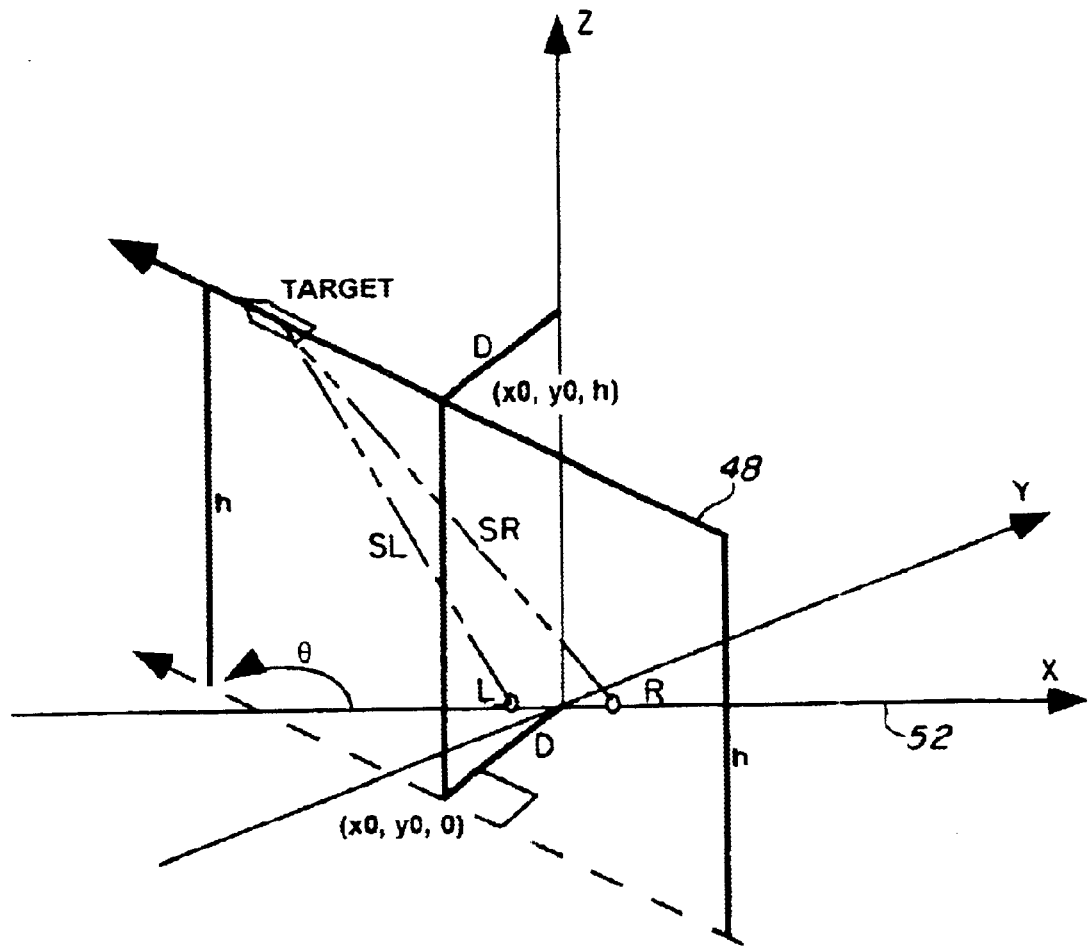
FIG. 5 shows the relative-geometry between the signal source and the two sensors.

To facilitate a top-level understanding, FIG. 4a shows a sensor-target geometry for use with a system diagram for a composite Hough transform shown in FIG. 4b. The acoustic signals 24 and 26 collected by each corresponding array 28 and 32 are processed by a split-array beamformer and cross-correlated by a split-array cross-correlator 34 and 36 to generate a broadband correlogram 38 and 42. The two broadband correlograms 38 and 42 are input to the CHT 44 for target detection and target track parameters estimation. The target tracks can be easily reconstructed from the track parameters; thus the CHT can be viewed as an inverse mapping from the delay curves in the two correlograms 38 and 42 to a target track 46. Sometimes this kind of two-sensor system is referred to as a dual-channel system, a more generic term indicating that the system can be operated with different types of sensor configuration. The two sensors are referred to as the left sensor and the right sensor. The line connecting the two sensors is the baseline, with the direction defined by the vector from the left sensor to the right sensor. The direction of the baseline must be consistent with the direction used in producing the broadband correlation. The center of the sensor system is the midpoint between the two sensors. A split array is a linear array split into two subarrays. Therefore, the two sensors of a dual-channel system are the subarrays of the array. FIG. 5 shows the relative geometry between the signal source and the two sensors. The signal source moves with a constant speed v along a linear track with direction θ and reaches its closest point of approach (CPA( ) to the center of the sensor system at a distance D at time $t_o$.

The track direction θ is the angle between the target track and the baseline of the sensor system 52, measured counterclockwise, and defined by a right-turn rule convention. First, a CPA ray is drawn from the center of the two-sensor system 51 to the CPA point 53. Second, move along the CPA ray 55, and make a right turn at the intersection of the CPA ray and the target track. 48. The track direction θ is positive if the target track 48 is headed in the direction of the right turn. Otherwise, the track direction θ is negative. FIGS. 6a through 6d shows this convention.

The two sensors 52 and 56 are indicated by two small ellipses; the center of the sensor system 58 is the origin; the direction of the sensor system 62 is to the eat and the baseline 64 of the sensor system is the horizontal line. Arrows that point from the origin to the target CPA indicate the CPA rays. The two target tracks 57 and 59 are shown in each of the four quadrants, FIGS. 6a through 6d: one with a positive direction 57 and one with a negative direction 59. The right-turn rule convention uniquely describes all possible target tracks.

Figure 7A:
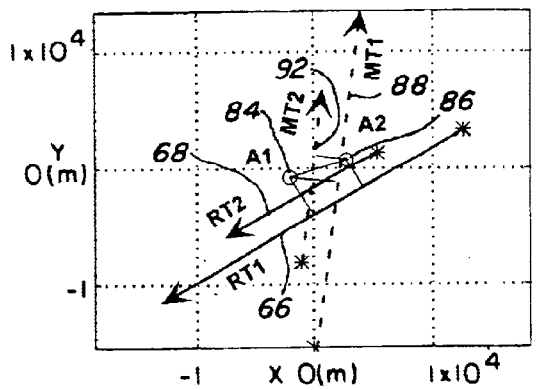
FIG. 7a shows a target-sensor geometry for a scenario of delay curve parameter ambiguity and the mirror effect.
Figure 7B:
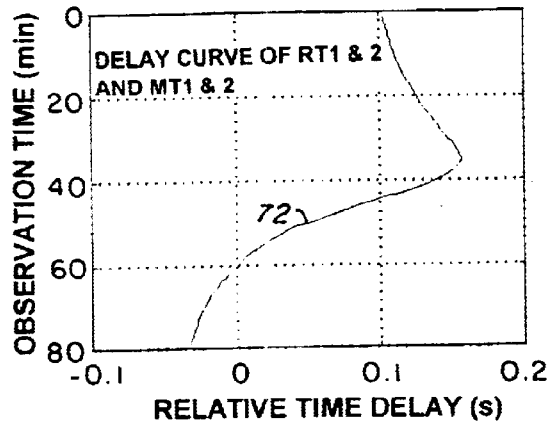
FIG. 7b shows a delay curve at array A1 for a scenario of delay curve parameter ambiguity and the mirror effect.
Figure 7C:
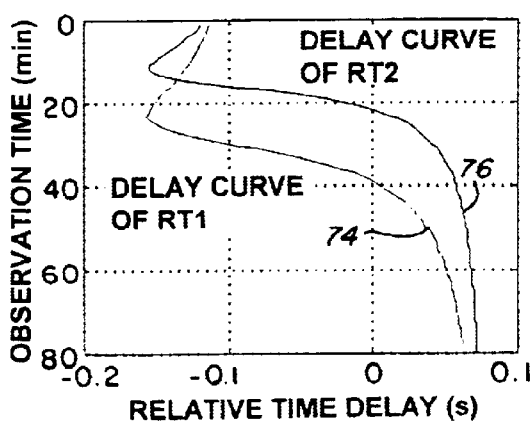
FIG. 7c shows the reference track delay curves observed by array A2 for a scenario of delay curve parameter ambiguity and the mirror effect.
Figure 7D:
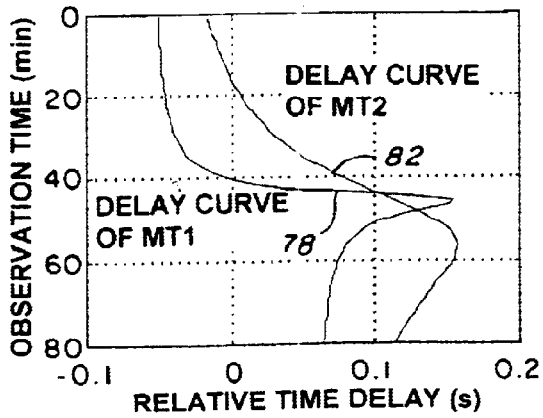
FIG. 7d shows the mirror track delay curves observed by array A2 for a scenario of delay curve parameter ambiguity and the mirror effect.

A two-linear-sensor-array system is used to resolve the two target-tracking problems associated with a single linear array. FIGS. 7a through 7d shows a sensor-target scenario associated with the delay curve parameter ambiguity and the mirror effect. FIG. 7a shows two different source tracks (RT1 and RT2) 66 and 68, respectively, with identical delay curve parameters (θ, $t_o$, v/D) with respect to array $A_1$ 84 and their associated mirror tracks (MT1 and MT2) 88 and 92, respectively, in the field of two linear arrays $A_1$ (primary array) 84 and $A_2$ (secondary array) 86. The primary array 84 and the secondary array 86 have orientations of −33.61° and 151.28° respectively. The interarray distance is 4.867 km., with the center of array $A_1$ 84 at −1976.3, −729.45 m and the center of array $A_2$ 86 at 2653.33, 773.28 m. The observation period is 80 min. The reference tracks 66 and 68 have a direction of 243.6° relative to the primary array and reach their CPA 40 min. into the run. RT1 66 has a speed of 4.5 knots and a CPA distance to $A_1$ 84 of 1.o nmi. RT2 68 has a speed of 9.0 knots and a CPA distance of 2.o nmi. The two tracks, therefore, have the same v/D ratio of 4.5, and hence produce the same delay curve in the primary correlogram. The difference between the reference tracks 66 and 68 and the mirror tracks 88 and 92 is the track direction relative to the primary array 84. The reference tracks 66 and 68 have a direction of 243.6° relative to the primary array, and the mirror tracks 88 and 92 have a direction of −243.6°. The two mirror tracks 88 and 92 also produce the same delay curves 72 in the primary correlogram. When viewed from the secondary array 86, however, the two reference target tracks RT1 66 and RT2 68 and the two associated mirror tracks MT1 88 and MT2 92 have different delay curve parameters and produce different delay curves in the secondary correlogram. Therefore, by using the second array 86, the mirror effect and the delay curve parameter ambiguities are resolved. Table 1 shows track parameters for the four tracks.

Figure 8:
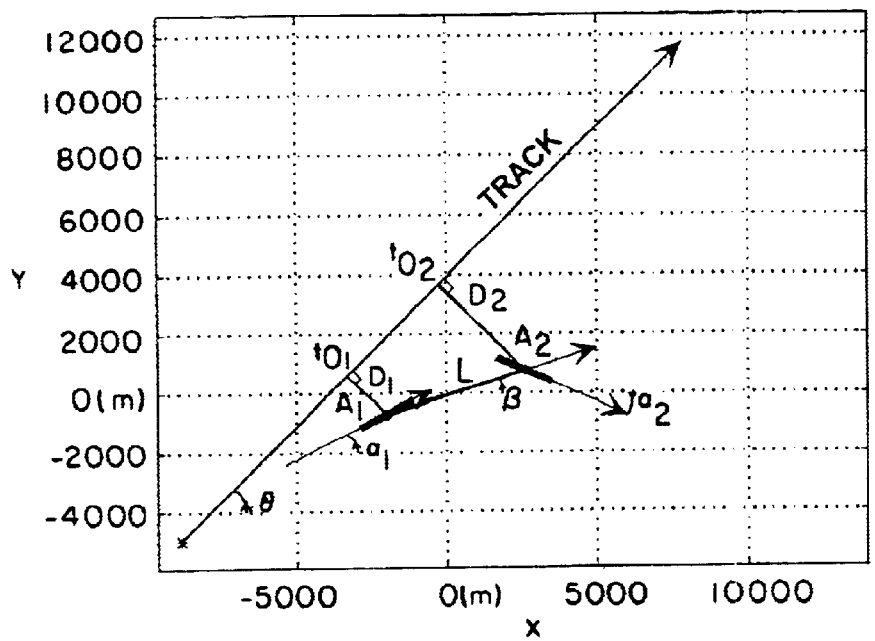
FIG. 8 shows a generic target-sensor geometry.

FIG. 8 shows a generic target-sensor geometry. From this target-sensor geometry, the geometric constraints between the primary array 94 and the secondary array 96 can be derived.

TABLE 1

| Track | v (kts) | $θ_1$ (°) | $D_1$ (nmi) | $t_{01}$ (min) | $θ_2$ (°) | $D_2$ (nmi) | $t_{02}$ (min) |
|---|---|---|---|---|---|---|---|
| RT1 | 4.5 | 243.6 | 1 | 40 | 58.7 | 0.453 | 14.29 |
| RT2 | 9.0 | 243.6 | 2 | 40 | 58.7 | 1.453 | 27.15 |
| MT1 | 4.5 | −243.6 | 1 | 40 | 248.5 | 1.378 | 52.19 |
| MT2 | 9.0 | −243.6 | 2 | 40 | 248.5 | 0.378 | 45.60 |

The primary array $A_1$ 94, and the secondary array $A_2$ 96 have orientations of $α_1°$ and $α_2°$, respectively. The orientation of an array is defined as the direction (measured counterclockwise relative to east) of the ray from the phase center of one of the split arrays to the other. The baseline (i.e., the line segment connecting the centers of the two arrays) between the two linear arrays has length L and an orientation (i.e., the direction of the ray connecting the primary array to the secondary array) of β°. The CPA ray direction X is defined as the angle difference between the CPA ray direction ω and the signal source track direction θ. The turn angle φ=ω−θ can only be either 90° or −90°. The target track satisfies the right turn rule when $$\text{sign}(\sin(φ))>0, \qquad (3)$$

where sign(X) is the sign function and has the value 1 if X>=0, and −1 if X<0. The target reaches its CPA to the primary array 94 at time $t_{01}$ with distance $D_1$; and reaches its CPA to the secondary array 96 at time $t_{02}$ with distance $D_2$. Table 2 summarizes the parameters used to describe the tracks with respect to these two arrays 94 and 96.

Figure 9A:
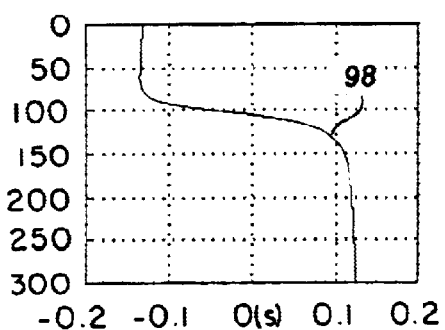
FIG. 9a shows the corresponding delay curve for FIG. 6 observed by the primary array.
Figure 9B:
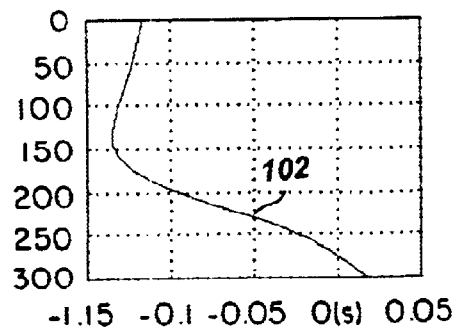
FIG. 9b shows the delay curve for FIG. 6 observed by the secondary array.

FIGS. 9a and 9b shows the corresponding delay curves 98 and 102 observed by the primary array 94 and the secondary array 96, respectively.

TABLE 2

| Symbol | Description |
|---|---|
| v | target speed |
| θ | reference track direction relative to east |
| $θ_1$ | reference track direction relative to primary array |
| $θ_2$ | reference track direction relative to secondary array |
| $α_1$ | orientation of the primary array |
| $α_2$ | orientation of the secondary array |
| β | orientation of the array pair |
| δ | difference between reference track direction and orientation of the array pair |
| $D_1$ | CPA distance from center of primary array to reference track |
| $D_{2r}$ | CPA distance from center of secondary array to reference track |

TABLE 2-continued

| Symbol | Description |
| --- | --- |
| $t_{o2}$ | CPA time of reference track with respect to secondary array |
| $\omega_2$ | CPA ray direction for secondary array |
| $\phi_{2r}$ | turn angle sat secondary array for reference track ($\omega_2 - \theta_2$). |

Based on the geometry of FIG. 8 and the fact that the same target speed is observed by two arrays, the track parameters must satisfy the following conditions:

(1) For track direction, $$\theta_1 = \theta - \alpha_1; \quad (4)$$

$$\theta_{2r} = \theta - \alpha_2; \quad (5)$$

(2) For CPA distance, $$D_{2r} = |D_1 + L\sin(\delta)| = |D_2 + L\sin(\theta - \beta)| \quad (6)$$

where $$\delta = \theta - \beta \quad (7)$$

(3) For CPA time, $$t_{o2} = t_{o1} + L\cos(\delta)/v = t_{o1} + L\sin(\theta - \beta)/v; \quad (8)$$

From these constraints, the track parameters relative to the secondary array 96 can be computed from the track parameters relative to the primary array 94. These parameters can be used in Eq. (1) to generate the corresponding delay line curves in the secondary correlogram. This allows the simultaneous integration over delay curves for the primary and secondary correlograms.

The Hough Transformation is a form of the matched spatial filter. See, Slansky, ON THE HOUGH TECHNIQUE FOR CURVE DETECTION, IEEE. Trans. Computer, Vol 27, No. 10, pp. 923–926, 1978. In essence, the Hough Transform hyposthesizes a set of prototypes in the image, performs integration along the prototypes, and stores the normalized integration value in the Hough space. The DCHT hypothesizes and integrates pixel values along hypothesized delay curves in a single correlogram. The CHT hypothesizes a reference track relative to the primary array and derives the corresponding delay curve. Given a hypothesized track for the primary array and using the geometric constraints previously discussed, a corresponding delay curve can be derived for the secondary correlogram. An integration process is then performed along each of these delay curves; one in the primary correlogram and one in the secondary correlogram. The integrated value from the primary correlogram is then combined with that from the secondary correlogram, ans the result is stored in the Hough parameter space.

Normally, targets are detected by searching peaks in the Hough Parameter Space. However, because of the potential problem of correlation misidentification, a different approachcalled onion-peeling has been developed, See, Brannan et al., DESIGN AND EVALUATION OF TRACK-BEFORE-DETECT PROCESSING FOR ACOUSTIC BROADBAND DATA, Tech. Rpt. No. 1736, Naval Command, Control and Ocean Surveillance Center, RDT&E Div., San Diego, Calif., January 1997. Onion peeling is an iterative process whereby the first target is detected by determining the highest peak in the parameter space. Based on the parameter values of the peak, corresponding delay curves are generated in the correlograms and pixel values along these delay curves are replaced with the original mean value of the correlogram. The newly modified correlograms are processed by the CHT and a second target is detected. This process continues either until a fixed number of targets have been detected or the highest remaining peak is below a certain threshold.

There are two versions of Composite Hough Transform: the Additive Composite Hough Transform (ACHT) and the Multiplicative Composite Hough Transform (MCHT). The ACHT can be mathematically represented as $$A(\theta_1, v, D_1, t_o) = \quad (9)$$
$$\int\int F_1(x,y)\delta(\tau_1(x,y))dxdy + \int\int F_2(x,y)\delta(\tau_2(x,y))dxdy$$

The MCHT is $$M(\theta_1, v, D_1, t_o) = \quad (10)$$
$$\int\int F_1(x,y)\delta(\tau_1(x,y))dxdy \times \int\int F_2(x,y)\delta(\tau_2(x,y))dxdy$$

where $A(\theta_1, v, D_1, t_{o1})$ is the value of the ACHT for a source with parameter $(\theta_1, v, D_1, t_{o1})$, $M(\theta_1, v, D_1, t_{o1})$ is the value of MCHT for a source with parameter $(\theta_1, v, D_1, t_{o1})$, is target speed $D_1$ is CPA horizontal distance from the source to primary array, $D_2$ is CPA distance from the source to the secondary array; $t_{o1}$ is CPA time of track observed by the primary array, $t_{o2}$ is CPA time of track observed by the secondary array, $\theta_1$ is track direction relative to primary array, $\theta_2$ is track direction relative to secondary array, $\tau_1(x,y)$ is delay curve trace in primary correlogram $(\theta_1, v, D_1, t_{o1})$, $\tau_2(x,y)$ is delay curve trace in secondary correlogram, $F_1(x,y)$ is pixel value of correlogram from primary array, and $F_2(x,y)$ is pixel value of correlogram from secondary array. A straightforward implementation of the CHT can be described as follows:

(a) hypothesize a track with track parameters values $(\theta_1, v, D_1, t_{o1})$;

(b) generate the corresponding template delay curve in the primary correlogram based on the delay curve parameter $(\theta_1, v/D_1, t_{o1})$;

(c) perform integration along the template delay curve in the primary correlogram;

(d) compute the delay curve parameter $(\theta_1, v/D_2, t_{o2})$ for the secondary array based on the geometric constraints, Eq. (4) through Eq. (8);

(e) generate the corresponding template delay curve in the secondary correlogram based on the delay curve parameter $(\theta_2, v/D_2, t_{o2})$;

(f) perform integration along the template delay curve in the secondary correlogram; and (g) combine both integrated values and store it in the corresponding Composite Hough Space.

These seven steps are repeated for each individual hypothesized track that is within a set of selected potential tracks. The computation burden and the memory requirement for the CHT are very large. However, relative to the primary array, a reference track and its associated mirror track will generate the same delay curve in the primary correlogram. This relation can be further exploited to reduce the computation burden and memory requirements of CHT. Since a reference track and its associated mirror track will produce the same delay curve in the primary correlogram, the integration values in the primary correlogram for a reference track will be identical to that of its mirror. There is no need to perform the integration process for the delay curve corresponding to a reference track in the primary correlogram. The result of the integration process for the delay curve corresponding to a reference track can be re-used and combined with the integration result of the delay curve corresponding to the associated mirror track in the secondary correlogram. By re-using the result of the integration process for the delay curve corresponding to a reference track in the primary correlogram, 50% of the computational burden for the primary correlogram can be saved. Exploiting another set of geometrical constraints that the associated mirror track has to satisfy can help one to achieve this computational saving:

$$\theta_m = \alpha_1 - \theta_1; \tag{11}$$

$$\theta_{2m} = \alpha_2 - \theta_m; \tag{12}$$

$$D_2 = |D_1 + L\ (\sin(\delta_m)| = |D_1 + L\ (\sin(\beta - \theta_m)|; \tag{13}$$

$$\delta_m = \beta - \theta_m; \tag{14}$$

$$t_{o2m} = t_{o1} + L\ \cos(\delta_m)/v = t_{o1} + L\ \cos(\beta - \theta_m)/v; \tag{15}$$

where $\theta_{2m}$ is the mirror track direction relative to secondary array;

$\delta_m$ is difference between mirror track direction and orientation of the array pair;

$D_{2m}$ is CA distance from center of secondary track to mirror track;

$t_{o2m}$ is CPA time of mirror track with respect to secondary array, and $\phi_{2m}$ is turn angle at secondary array for mirror tack $(\omega_2 - \theta_{2m})$.

This set of geometric constraints can be derived using a similar target-sensor geometry shown in FIG. 8, with the exception that the reference track is replaced by the associated mirror track. The revised implementation for the CHT can be described as follows:

(a) hypothesize a track with track parameters values ($\theta_1$, v/$D_1$, $t_{o1}$);

(b) generate the corresponding template delay curve in the primary correlogram based on the delay curve parameter ($\theta_1$, v/$D_1$, $t_{o1}$);

(c) perform integration along the template delay curve in the primary correlogram;

(d) compute the delay curve parameter ($\theta_2$, v/$D_2$, $t_{o2}$) for the secondary array based on the geometric constraints, Eq.(4) through Eq. (8);

(e) generate the corresponding template delay curve in the secondary correlogram based on the delay curve parameter ($\theta_2$, v/$D_2$, $t_{o2}$);

(f) perform integration along the template delay curve in the secondary correlogram;

(g) compute the delay curve parameter ($\theta_{2m}$, v/$D_{2m}$, $t_{o2m}$) for the secondary array based on the geometric constraints, Eq. (11) through Eq. (15);

(h) generate the corresponding template delay curve in the secondary correlogram based on the delay curve parameter ($\theta_{2m}$, V/$D_{2m}$, $t_{o2m}$);

(i) perform integration along the template delay curve in the secondary correlogram;

(j) combine the integrated values and store it in the corresponding Composite Hough Space.

In essence, the revised implementation of the CHT simultaneously processes two hypothetical tracks in one processing cycle; one is the reference track and the other is its associated mirror track. On the other hand, the straight forward version processes the reference track and its associated track in two processing cycles. Although the revised implementations of the CHT seems to have more steps than the straightforward version, the saving in computational burden is quite significant.

Depending on the need, the Composite Hough Space can be organized into different configurations. For example, the Composite Hough Space can be organized as two four-dimensional (v, D, θ, $t_0$) subspaces. One of the subspaces contains all tracks that are positive according to the right-turn rule with respect to the primary array. The other contains all negative tracks. Separating positive and negative tracks this way is equivalent to separating tracks that are mirrors of each other. Therefore, designate the subspace containing the positive tracks as the Reference Track Composite Hough Space (RTCHS) of hypothesized reference tracks for the primary array. And, the subspace of negative tracks is designated the Mirror Track Composite Hough Space (MTCHS). If the RTCHS contains the combined integrated pixel values of the delay curve in the primary correlogram and the corresponding delay curve in the secondary correlogram for a reference track, then the MTCHS will contain the combined integrated pixel values of the delay curve in the primary correlogram and the corresponding delay curve in the secondary correlogram for the associated mirror track. Target detection and track parameter estimation are performed through peak searching and thresholding in both the Composite Hough Spaces. A track is identified as a reference track if the peak is in the RTCHS and a mirror track if the peak is in the MTCHS.

To save memory, the Composite Hough Space can be organized as a combination of the two subspaces; each cell in the combined Composite Hough Space stores the maximum value of the corresponding pixels in the RTCHS and MTCHS. Each cell on the combined Composite Hough Space has an associated flag to indicate whether the cell value comes from the RTCHS or the MTCHS. This configuration does not suppress some information. For example, two different targets, one moving along a reference track and the other along the associated mirror track, will generate a peak in RTCHS and a peak in MTCHS and these two peaks will be combined into one peak. The CHT will then detect one target instead of two. However, the likelihood of two different targets moving exactly together along mirror tracks is negligible. The two-subspace approach is used herein.

Figure 10:
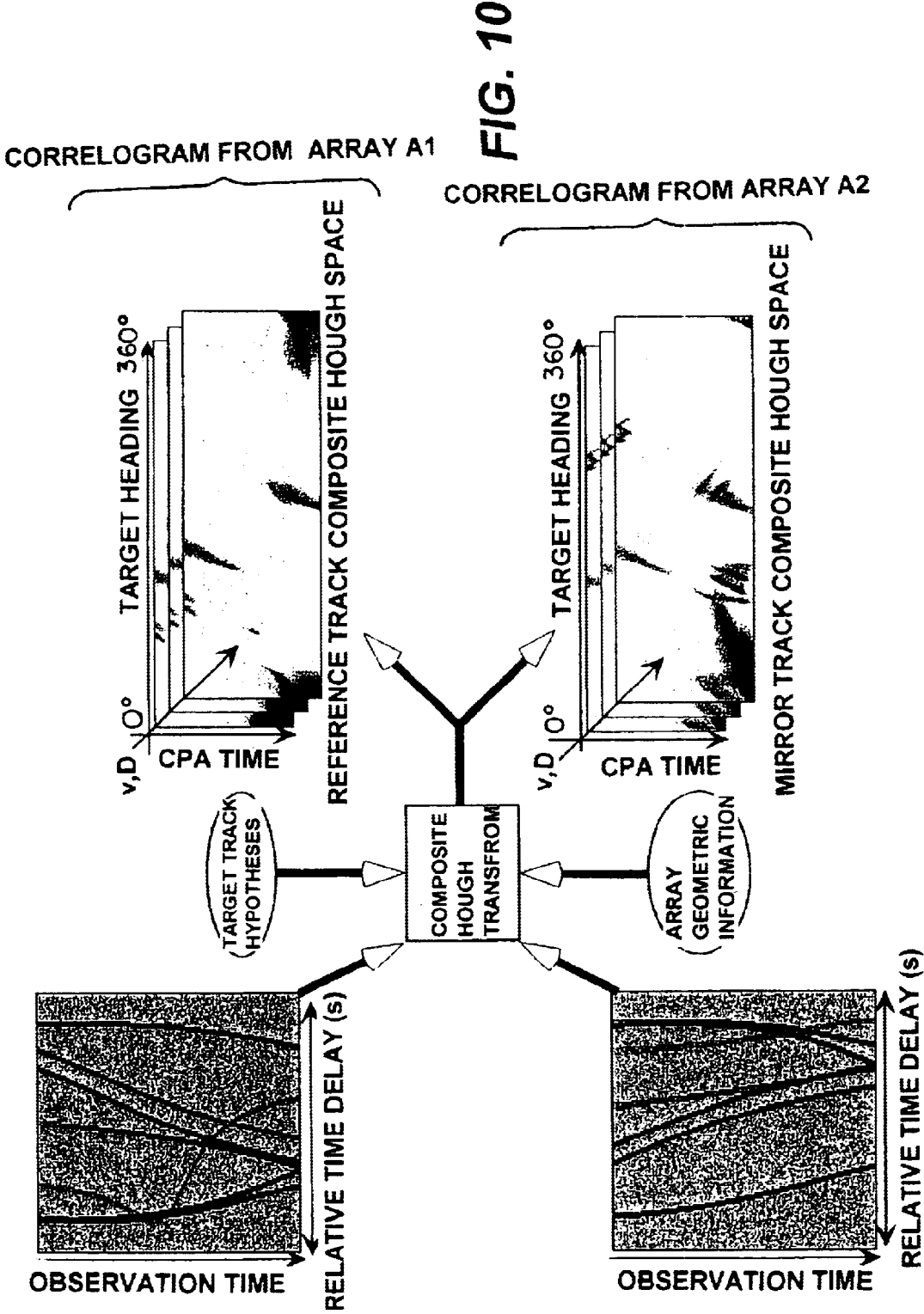
FIG. 10 shows a data flow diagram of the Composite Hough Transform.

FIG. 10 shows a data flow diagram of the Composite Hough Transform. Two broadband correlograms, one from primary array ($A_1$) and one from the secondary array ($A_2$), the geometric information of sensor arrays, and a set of hypotheses of target track are input to the CHT. The outputs of the CHT are the Reference Track Composite Hough Space and the Mirror Track Composite Hough Space. Each has four dimensions: signal source track direction, CPA tie, CPA horizontal distance, and target speed, where the track direction, CPA time, and the CPA horizontal distance are measured relative to the primary array. Peaks in the Composite Hough Space correspond to potential targets. The location of the peak determines the value of the track parameters.

The following five different simulation cases illustrate:
(a) basic behavior of the ACHT,
(b) resolution of the mirror effect by ACHT,
(c) resolution of the delay curve parameter ambiguity by ACHT,
(d) behavior of the MCHT, and
(e) difference in the detection sequence between the ACHT and MCT.

FIGS. 11a through 11c shows two sensor arrays: a primary array ($A_1$) and a secondary array ($A_2$) indicated by two circles 104 and 106, respectively, with a short line segment inside each individual circle indicating the orientation of the array 108 and 112, respectively. The thick solid line 114 is the track of the target. FIG. 11b is the primary correlogram with the correlation trace 116 produced by the track 114. FIG. 11c is the secondary correlogram. The geometric information for the primary array 104 and the secondary array 106 are shown in Table 3, and the simulated target's track parameters relative to the primary array 104 are summarized in Table 4. Note the direction of the simulated target track, 120°, is measured counterclockwise from east; the CPA range and CPA time are measured with respect to the primary array 104.

TABLE 3

|  | X-Y coordinates of the array center | Orientation of the array |
| --- | --- | --- |
| Primary array | (−1976.13 −729.45) m | −33.61° |
| Secondary array | (2653.22 773.28) m | 151.28° |

TABLE 4

|  | Heading | Speed (knt) | CPA range (nmi) | CPA time (sweep) |
| --- | --- | --- | --- | --- |
| Track parameter | 120° | 9 | 1.0 | 64 |

FIG. 12a shows the corresponding Composite Hough Space produced by the ACHT for v=9.0 kts and $D_1$=1.0 nmi; FIG. 12b shows the MCHTS. The vertical axis is the CPA time, and the horizontal axis is the track direction; both measured relative to the primary array 104. There are two peaks in the Composite Hough Space, one in the RTCHS and the other in the MTCHS. The peak in the RTCHS is the real peak and has a normalized value of 225. The peak in the MTCHS is a sidelobe and has a value of 141. Based on this observation, it seems that the CT is creating a false target. In fact, after the onion-peeling process, both peaks will be removed as the corresponding correlation traces are removed from the correlograms. When the CHT is performed on these correlograms, there is no peak in the Composite Hough Space with a value above the threshold.

FIG. 13a through 13d shows how the CHT can differentiate the reference track from its associated mirror track. FIG. 13a shows the sensor-target geometry with both target track 122 and associated mirror track 124. FIG. 13b and 13c shows the same correlograms 116 and 118 depicted in FIGS. 11b and 11c. FIG. 13d shows the secondary correlogram 128, with correlation traces produced by a source traveling along the mirror track. FIGS. 14a and 14b shows the Composite Hough Space produced by the ACHT, using FIG. 13a as the primary correlogram and FIG. 13d as the secondary correlogram. Like FIGS. 12a and 12b, there are two peaks in the Composite Hough Space (FIGS. 14a and 14b); one in the RTCHS and the other in MTCHS. The peak in the MTCHS is the real peak, while the peak in the RTCHS is a sidelobe. This output of ACHT indicates that the actual track is a mirror track. The difference between FIGS. 14a through 14b and FIGS. 12a and 12b clearly indicates that, using two correlograms, Composite Hough Transform can discern a reference track from its mirror track.

FIGS. 15a through 15c shows a scenario with a delay curve parameter ambiguity. The sensor array information is the same as shown in Table 3. There are two tracks 132 and 134, with the track parameters given in Table 1. FIG. 15a shows the target-sensor geometry for this scenario. FIG. 15b shows the primary correlogram, with only one correlation trace 136; the two tracks have the same delay curve parameters relative to the primary array 132. FIG. 15c shows the secondary correlogram, with two correlation traces 138 and 142 produced by the two tracks. Since the signal source speed is higher for the RT1 132, its correlation trace has a higher rate of relative time delay change.

Figure 16A:
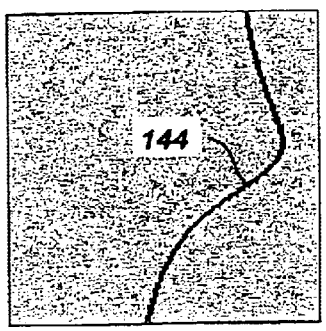
FIG. 16a shows the first detected correlation trace as a result of a first layer onion-peeling on the primary correlation.
Figure 16B:
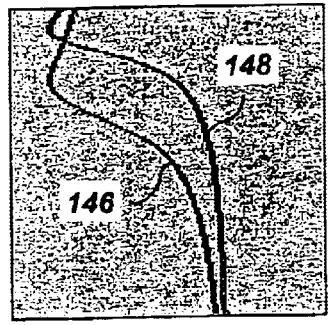
FIG. 16b shows the first detected correlation trace as a result of a first layer onion-peeling on the secondary correlation.
Figure 16C:
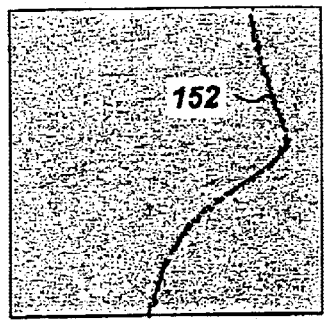
FIG. 16c shows the second detected correlation trace as a result of a second layer onion-peeling on the primary correlation.
Figure 16D:
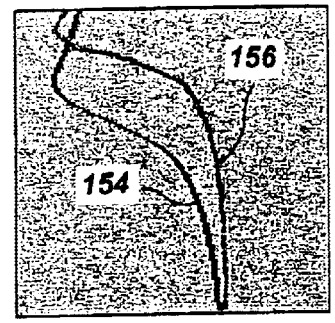
FIG. 16d shows the second detected correlation trace as a result of a second layer onion-peeling on the secondary correlation.

FIGS. 16a through 16d shows the outputs of two-layer onion-peeling produced by the ACHT. FIG. 16a and 16b show the first detected primary correlation trace 144, and secondary correlation trace 146 and 148. FIGS. 16c and 16d show the second detected primary correlation trace 152 and the secondary correlation trace 154 and 156. To demonstrate that the CHT can detect both correlation traces in the secondary correlogram, the correlation trace in the primary correlogram 144 is used twice. A peeling value of one standard deviation above the mean of the input correlogram was used to paint the detected correlation trace during the onion-peeling process in this case.

Figure 17A:
FIG. 17a shows the slice of RTCHS produced by the ACHT for a speed of 4.5 kts and $D_1$ of 1.0 nmi.
Figure 17B:
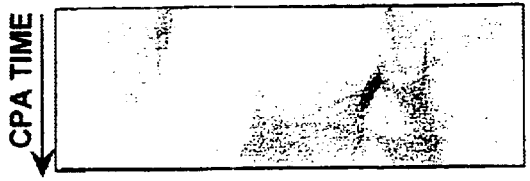
FIG. 17b shows the slice of and MTCHS produced by the ACHT for a speed of 4.5 kts and $D_1$ of 1.0 nmi.
Figure 17C:
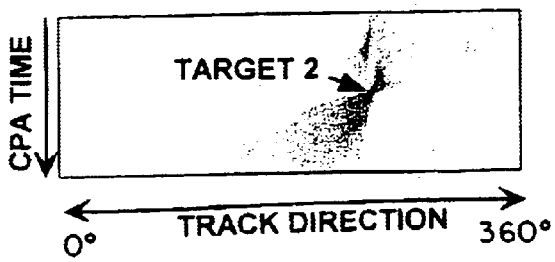
FIGS. 17c and 17d shows the slice of RTCHS and MTCHS for a speed of 9.0 kts and $D_1$ of 2.0 nmi.
Figure 17D:

FIGS. 17a and 17b show slices from the corresponding Composite Hough Space. FIG. 17a and 17b show the slice of RTCHS and MTCHS produced by the ACHT for a speed of 4.5 kts and $D_1$ of 1.0 nmi while FIGS. 17c and 17d shows the slice of RTCHS and MTCHS for a speed of 9.0 kts and $D_1$ of 2.0 nmi. The presence of the two peaks in the Composite Hough Space indicates that the CHT can distinguish different target tracks with identical delay curve parameters relative to the primary array.

Figure 18A:
FIG. 18a shows the output Reference Track Composite Hough Space produced by the ACHT.
Figure 18B:
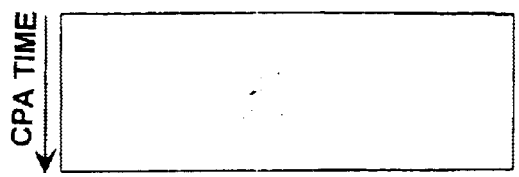
FIG. 18b shows the output Mirror Track Composite Hough Space produced by the ACHT.
Figure 18C:
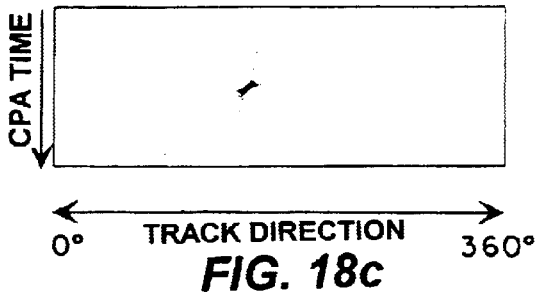
FIG. 18c shows the output Reference Track Composite Hough Space produced by the MCHT.
Figure 18D:
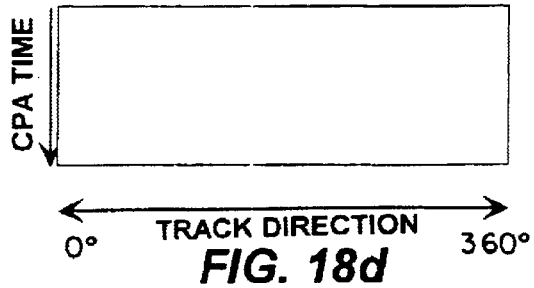
FIG. 18d shows the output Mirror Track Composite Hough Space produced by the correlograms shown in FIG. 20.

The Multiplicative Composite Hough Transform (MCHT) tends to suppress the sidelobes in the Composite Hough Space more than the Additive Composite Hough Transform (ACHT). To demonstrate this refer to FIG. 11a. Correlograms FIGS. 11b and 11c are input to both the ACHT and MCHT; corresponding Composite Hough Transform produced by the ACHT as shown in FIG. 18a through 18d. FIGS. 18a and 18b show the output Composite Hough Space produced by the ACHT; FIGS. 18c and 18d show the output Composite Hough Space produced by the MCHT. The sidelobes produced by the MCHT are lower than those produced by the ACHT. The output signal-to-noise-ratio is defined as $$SNR_{output} = 20 * \log\left(\frac{Peak - Mean}{Stdv}\right) \qquad (16)$$

where

Peak is the peak value in Composite Hough Space,

Mean is the average value in the Composite Hough Space, and

Stdv is the standard deviation in the Composite Hough Space. The peak statistic for the Composite Hough Spaces shown in FIGS. 18a through 18d are given in Table 5.

TABLE 5

|  | Peak | Mean | Stdv | SNR |
|---|---|---|---|---|
| MCTHS produced by the ACHT | 141 | 18.04 | 17.96 | 16.71 |
| RTCHS produced by ACHT | 255 | 18.02 | 20.45 | 21.28 |
| MTCHS produced by MCHT | 91 | 11.32 | 12.25 | 16.26 |
| RTCHS produced by MCHT | 255 | 11.52 | 15.02 | 24.20 |

Figure 19A:
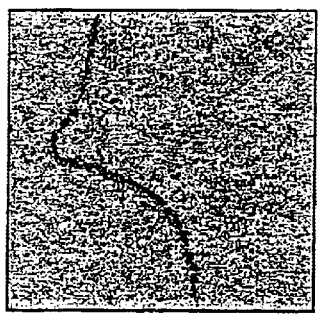
FIG. 19A is a primary correlogram for low input signal to noise ratio case
Figure 19B:
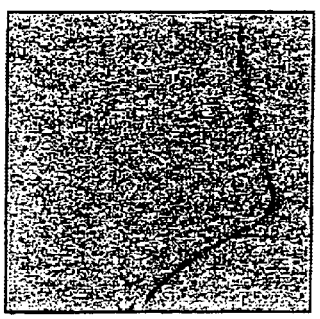
FIG. 19B is a secondary correlogram for low input signal to noise ratio
Figure 19C:
FIG. 19C is a reference track composite Hough space of additive composite Hough transform
Figure 19D:
FIG. 19D is a mirror track composite Hough space of additive compose Hough transform
Figure 19E:
FIG. 19E is a reference track composite Hough space of multiplicative composite Hough transform
Figure 19F:
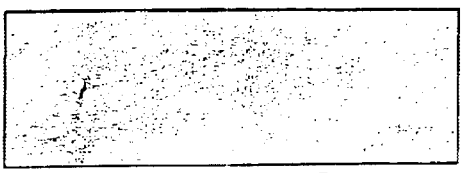
FIG. 19F is a mirror track composite Hough space of multiplicative composite Hough transform

As previously stated in regard to Composite Hough Transform, the peaks in the RTCHS are real target peaks and have a higher value, and the peaks in the MTCHS are the sidelobes. The key point in Table 5 is that the difference of output SNR in RTCHS is about 3 dB while it is 0.4 dB in MTCHS. Thus, the MCHT suppresses the sidelobes more and provides a better peak localization. However, this behavior of MCHT is limited in low SNR. FIGS. 19a through 19f shows a pair of correlograms with SNR of 0.0 dB. FIG. 19a shows the primary correlogram, and FIG. 19b shows the secondary correlogram. FIGS. 19c and 19d show the result of ACHT, FIGS. 19e and 19f show the result of MCHT. The output SNR is 22.7 for ACHT and 23.2 for MCHT. These two values are very close, confirming that MCHT and ACHT behave the same way in the low input SNR scenario.

Figure 20:
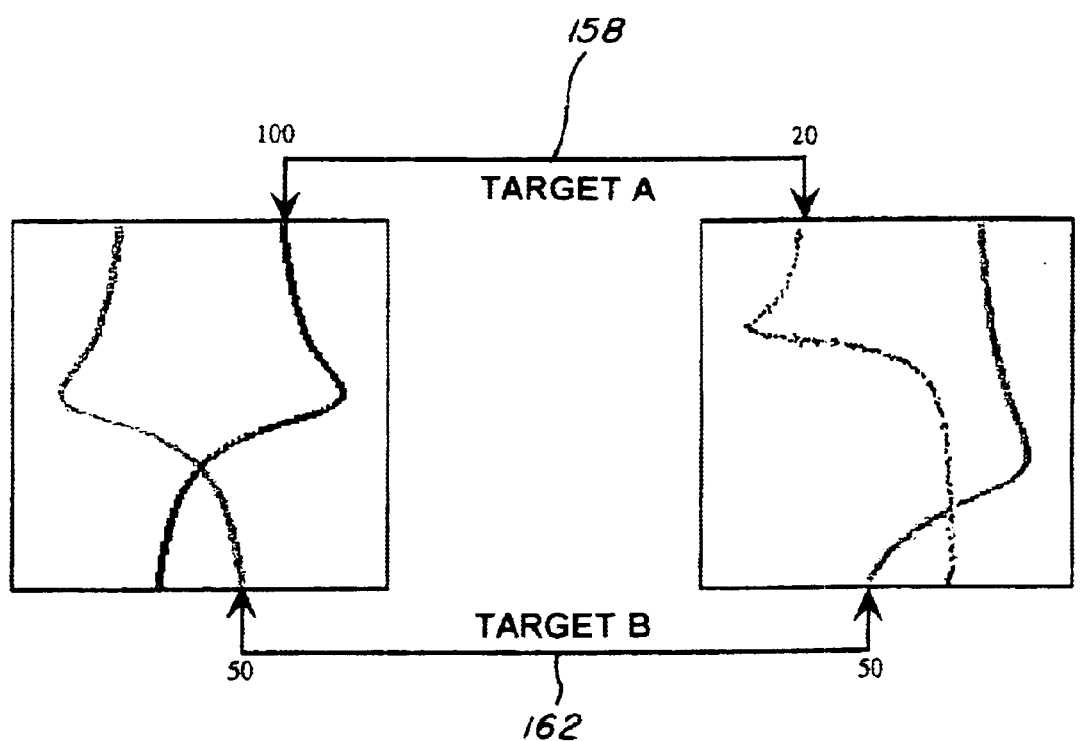
FIG. 20 is the correlation traces of target A with dramatically different intensities in the primary correlogram (100) and the secondary correlogram (20) while the correlation traces of target B have the same intensity (50) in both the primary correlogram and the secondary correlogram

The sequence of target detection of the ACHT can differ from that of the MCHT. FIG. 20 shows an example of such an occurrence. There are two targets (A 158 and B 162). The intensities of the correlation traces of target A 158 in the primary correlogram are dramatically different from those in the secondary correlation and 20 in the secondary correlogram. On the other hand, for target B 162, the intensities of the correlation traces are 50 in both primary and secondary correlograms.

Figure 21A:
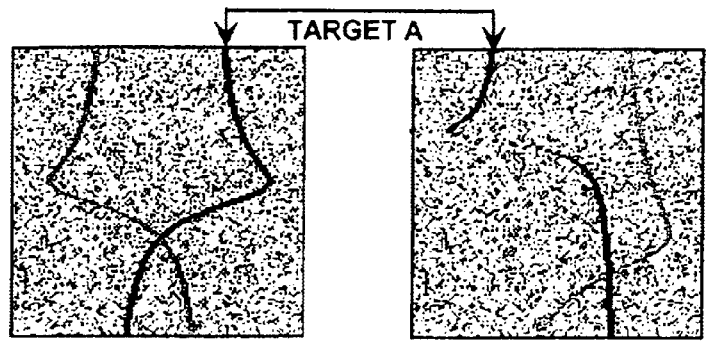
FIG. 21A is the result of $1^{st}$ onion peeling produced by the additive composite Hough transform
Figure 21B:
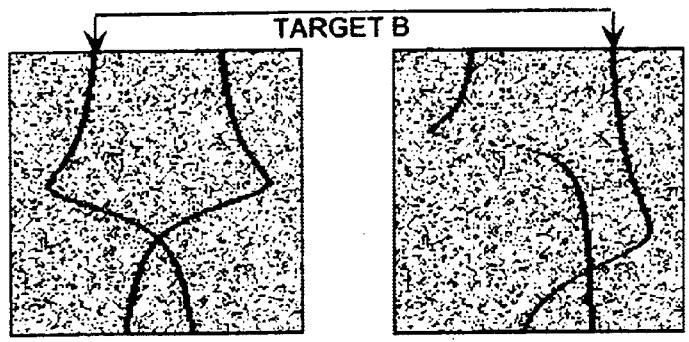
FIG. 21B is the result of the $2^{nd}$ onion peeling produced by the additive composite Hough transform
Figure 21C:
FIG. 21C is the reference track composite Hough space at the $1^{st}$ onion peeling produced by additive composite Hough transform
Figure 21D:
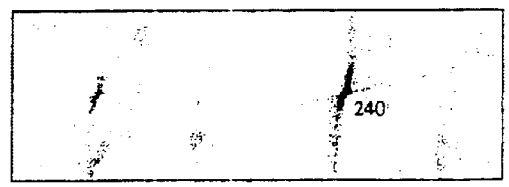
FIG. 21D is the mirror track composite Hough space at the $1^{st}$ onion peeling produced by the additive composite Hough transform
Figure 21E:
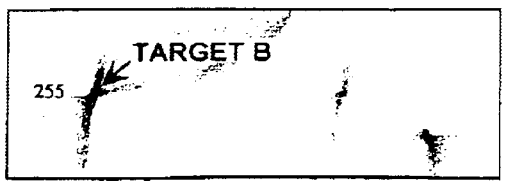
FIG. 21E is the reference track composite Hough space at the $2^{nd}$ onion peeling produced by additive composite Hough transform
Figure 21F:
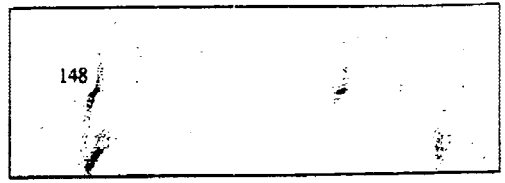
FIG. 21F is the mirror track composite Hough space at the $2^{nd}$ onion peeling produced by the additive composite Hough transform
Figure 22A:
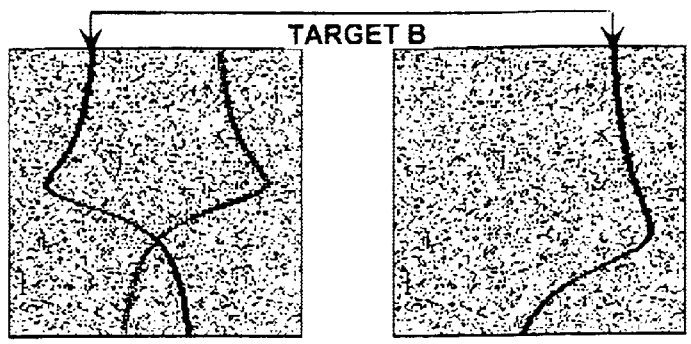
FIG. 22A is the result of the $1^{st}$ onion peeling produced by the multiplicative composite Hough transform
Figure 22B:
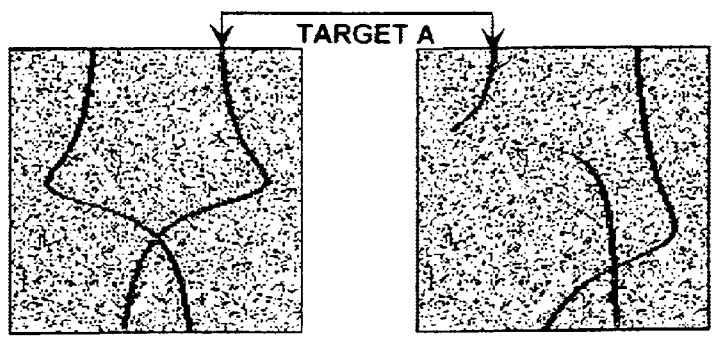
FIG. 22B is the result of the $2^{nd}$ onion peeling produced by the multiplicative composite Hough transform
Figure 22C:
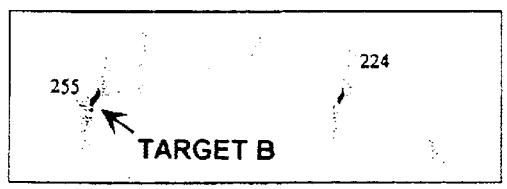
FIG. 22c shows RTCHS at the first onion-peeling produced by MCHT.
Figure 22D:
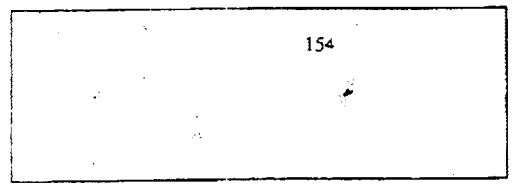
FIG. 22d shows MTCHS at the first onion-peeling produced by MCHT.
Figure 22E:
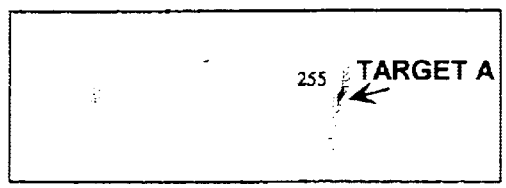
FIG. 22e shows RTCHS at the second onion-peeling produced by MCHT.
Figure 22F:
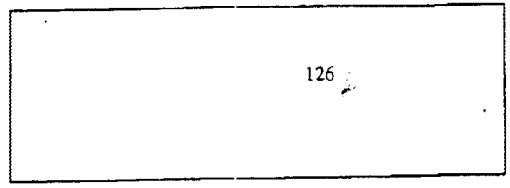
FIG. 22f shows MTCHS at the second onion-peeling produced by MCHT.

FIG. 21a through 21f shows the results of the ACHT while FIGS. 22a through 22f shows the results of the MCHT. In each case, FIGS. 21a and 22a shows the results of the first layer of onion-peeling and FIGS. 21b and 22b shows the results of the second layer onion-peeling. Since the sum of the two correlation traces for target A 158 is 120 while that for the two target B 162 correlation traces is 100, the ACHT first detects the target A 158, then target B 162. For the multiplicative Composition Hough Transform, the product of the two target A 158 traces is 2000 while the product of the two target B 162 traces is 2500. Thus, the MCHT will first detect the target B 162 and then will detect the target A 158.

Experimental Results with Real Data

Figure 23A:
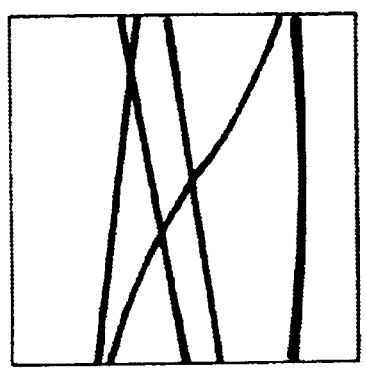
FIG. 23a shows the broadband correlogram from the primary array as a result of the onion-peeled Additive Composite Hough Transform.
Figure 23B:
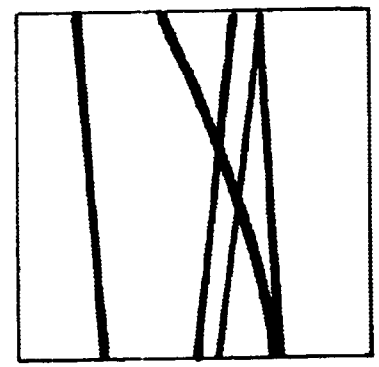
FIG. 23b shows the broadband correlogram from the secondary array as a result of the onion-peeled Additive Composite Hough Transform.

The real data used here is that shown in FIGS. 3a and 3b. These data were collected from a shallow-water environment with heavy surface ship traffic. The geometry of the two neighboring sensor arrays is listed in Table 1. The results of onion-peeling are shown in FIGS. 23a and 23b. The traces are as follows: first detected pair 164, the second detected pair 166, the third detected pair 166, the fourth detected pair 168, and the fifth detected pair 172. The reconstructed delay curves closely match the real-data correlation traces, with the exception of the third target 166 where the real-data correlation trace near the end of the observation period does not match the line depicting the third trace 166. This mismatch is not expected; the CHT assumes that the targets maintain a constant course and the third target 166 had a course change near the end of the observation period.

TABLE 6

| Target ID | Heading (deg) | CPA range (nmi) | CPA time (sweep) | Speed (kts) |
|---|---|---|---|---|
| 1 | 291.1 | 3.0 | 57 | 9.0 |
| 2 | 127.6 | 12.8 | 116 | 8.5 |
| 3 | 209.8 | 12.8 | 7 | 9.0 |
| 4 | 109.6 | 12.8 | 118 | 8.5 |
| 5 | 344.2 | 8.9 | 96 | 7.0 |

Figure 24:
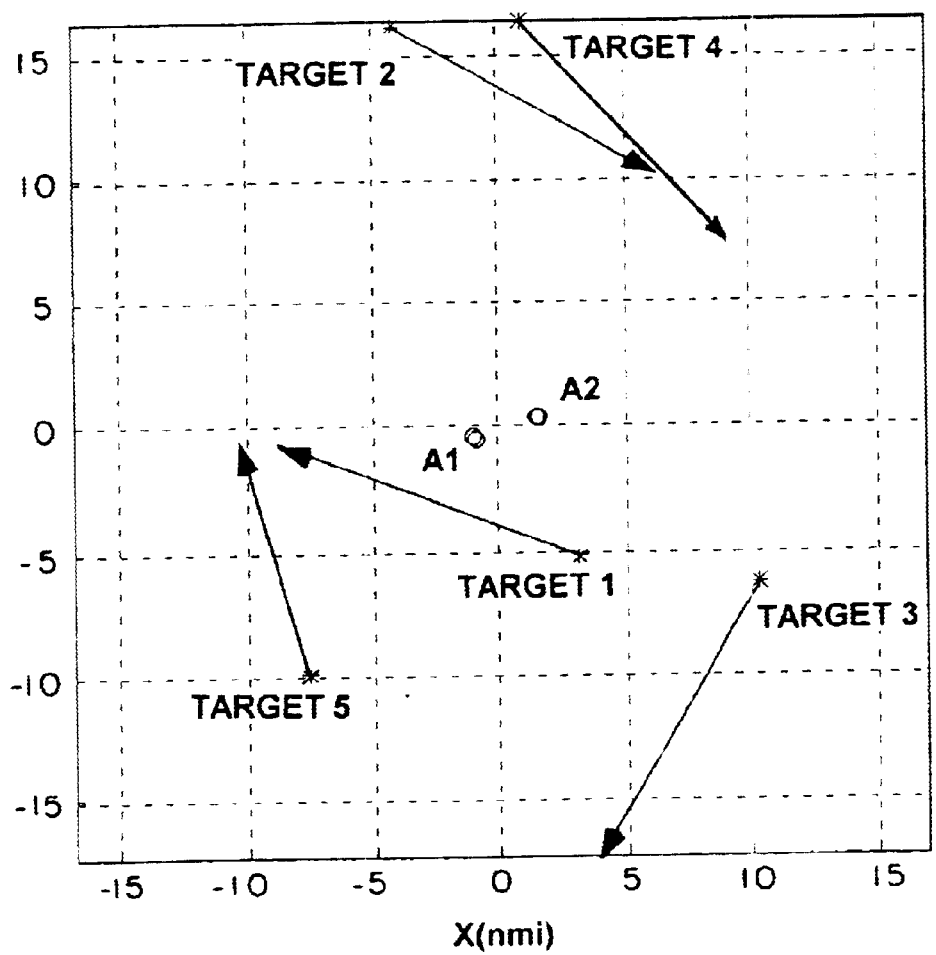
FIG. 24 shows the sensor geometry and the reconstructed target tracks
Figure 25A:
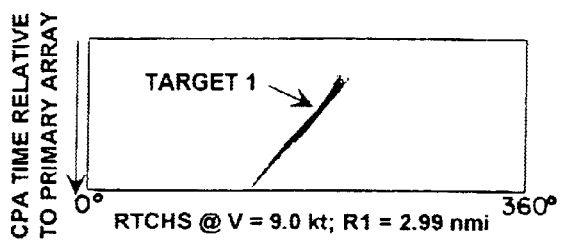
FIG. 25a shows the ACHT's output Composite Hough Space for the real data for RTCHS at v=9.0 kts, T1=2.99 nmi.
Figure 25B:
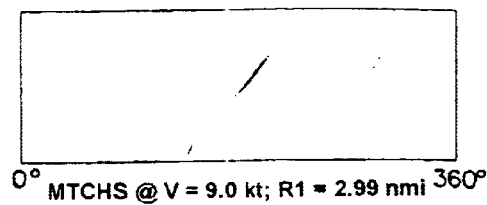
FIG. 25b shows the MCHT's output Composite Hough Space for the real data for RTCHS at v=9.0 kts, T1=2.99 nmi.
Figure 25C:
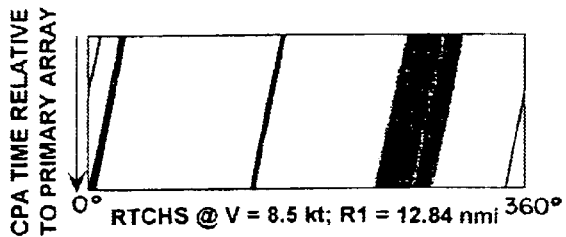
FIG. 25c shows the RCHT's output Composite Hough Space for the real data for RTCHS at v=8.5 kts, T1=12.84 nmi.
Figure 25D:
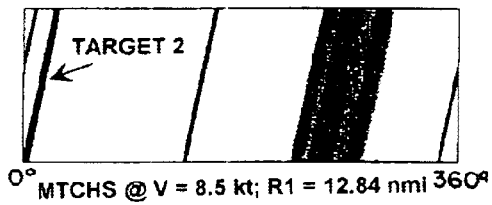
FIG. 25d shows the MCHT's output Composite Hough Space for the real data for RTCHS at v=8.5 kts, T1=12.84 nmi.
Figure 25E:
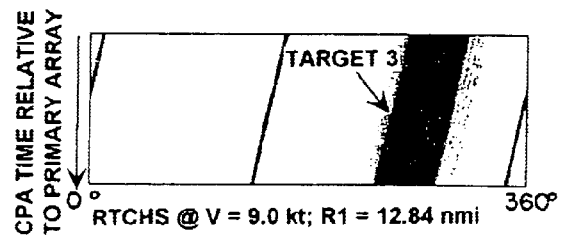
FIG. 25e shows the RCHT's output Composite Hough Space for the real data for RTCHS at v=9.0 kts, T1=12.84 nmi.
Figure 25F:
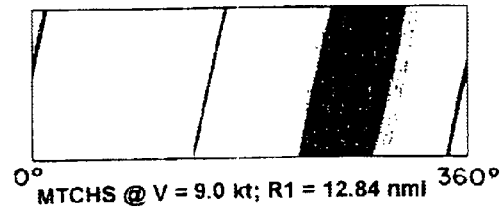
FIG. 25f shows the MCHT's output Composite Hough Space for the real data for RTCHS at v=9.0 kts, T1=12.84 nmi.
Figure 25G:
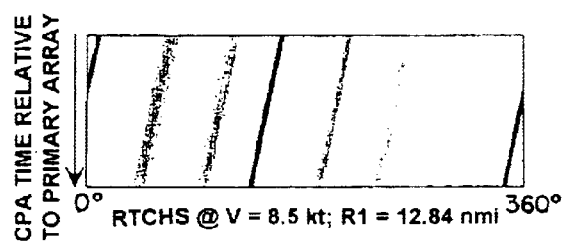
FIG. 25g shows the RCHT's output Composite Hough Space for the real data for RTCHS at v=8.5 kts, T1=12.84 nmi.
Figure 25H:
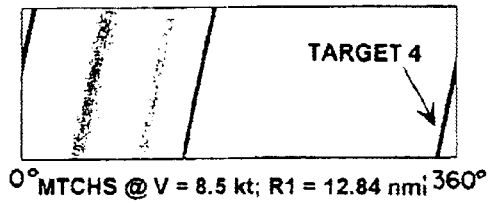
FIG. 25h shows the MCHT's output Composite Hough Space for the real data for RTCHS at v=8.5 kts, T1=12.84 nmi.
Figure 25I:
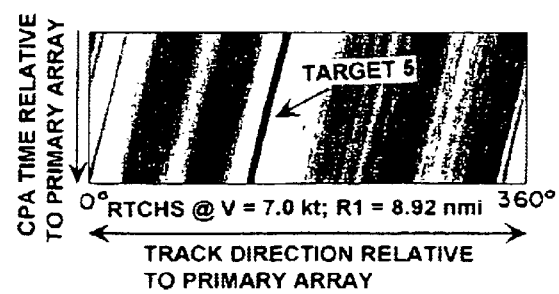
FIG. 25i shows the RCHT's output Composite Hough Space for the real data for RTCHS at v=7.0 kts, T1=8.92 nmi.
Figure 25J:
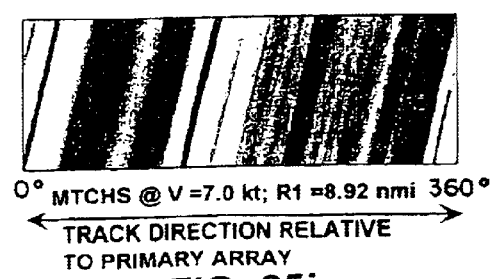
FIG. 25j shows the MCHT's output Composite Hough Space for the real data for RTCHS at v=7.0 kts, T1=8.92 nmi.
Figure 26:
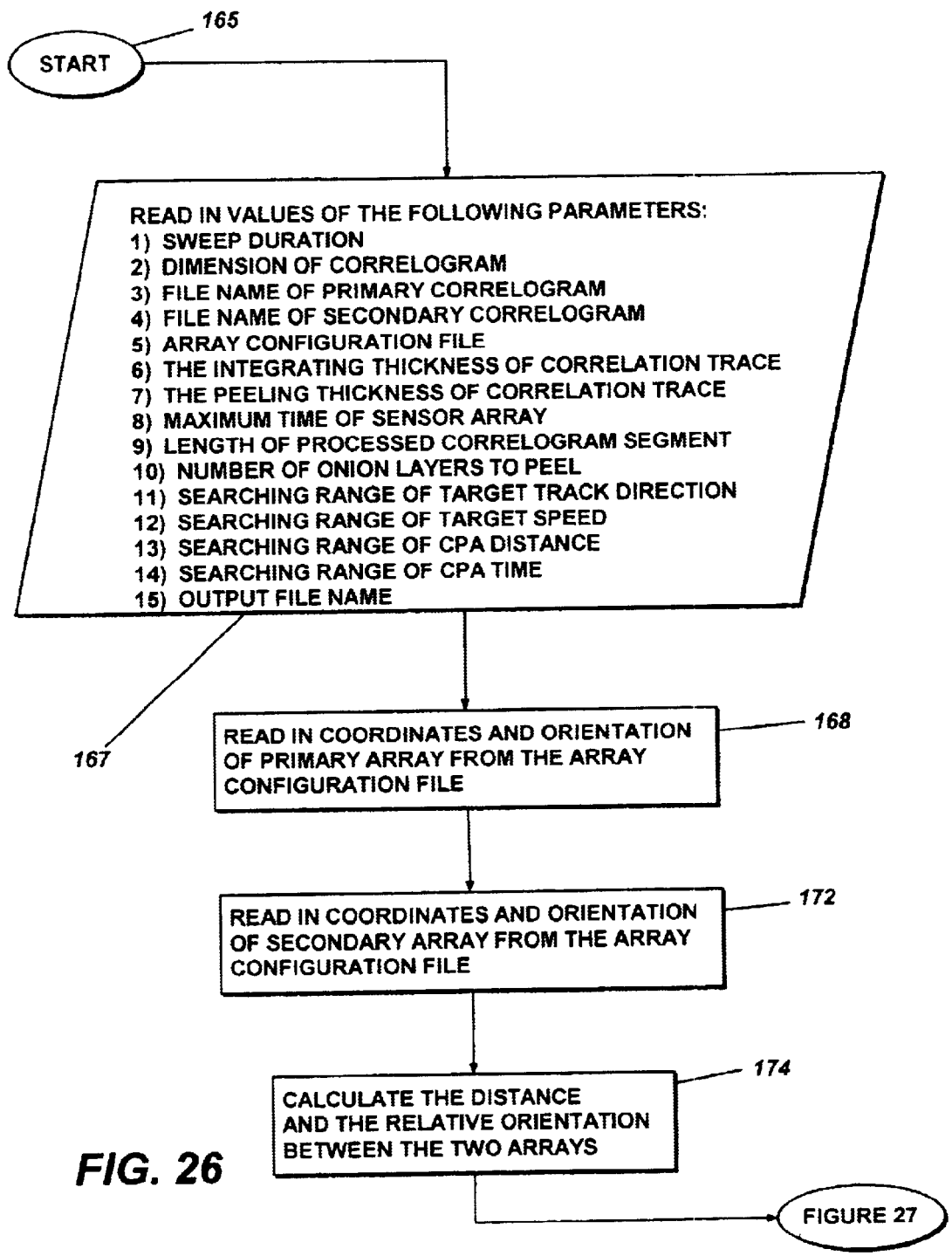
FIG. 26 shows a basic flow chart for an additive composite Hough transform.
Figure 27:
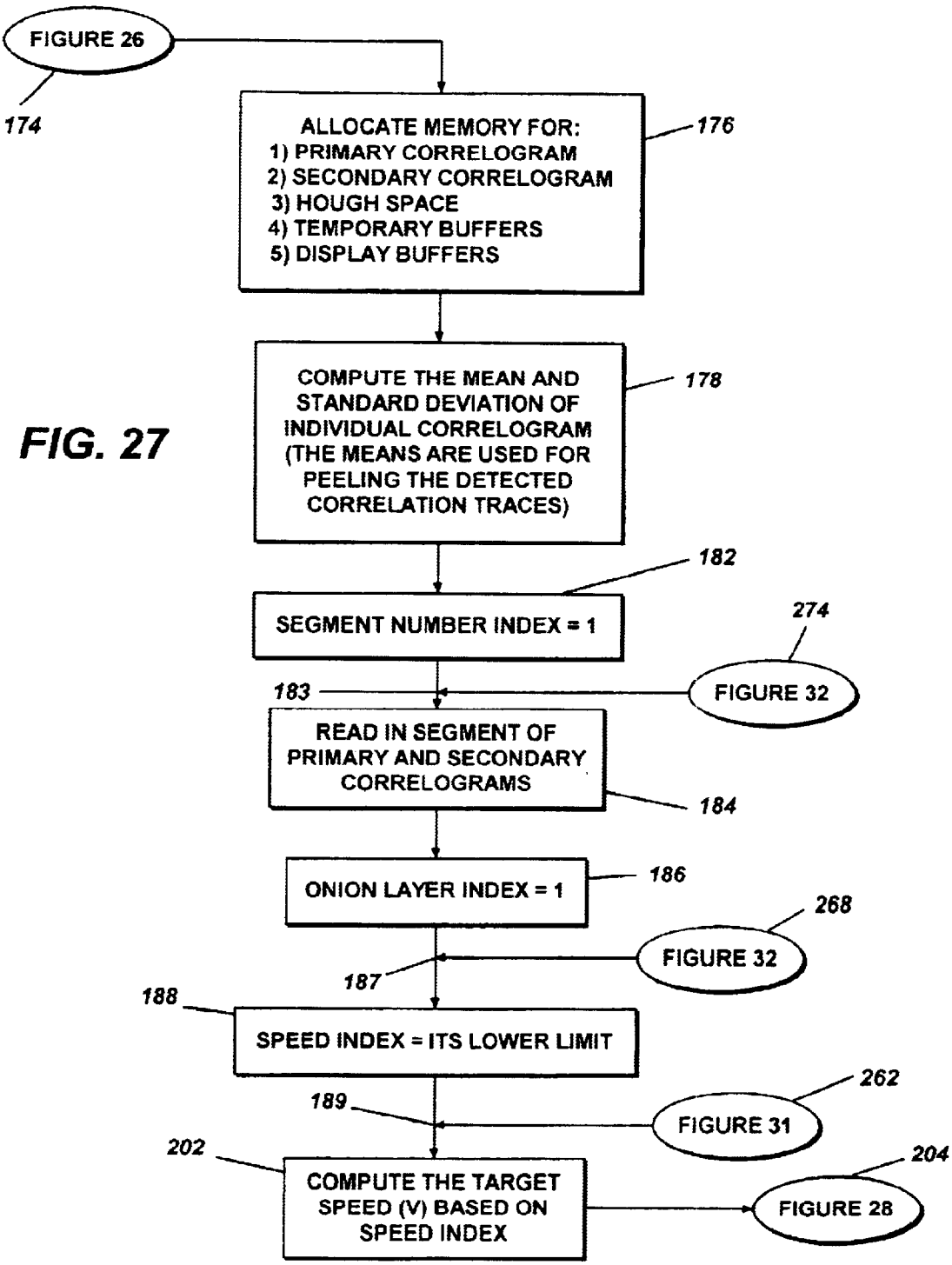
FIG. 27 shows a basic flow chart for an additive composite Hough transform.

Table 6 shows the estimated track parameters for the five targets. The heading of the target is measured clockwise relative to north. FIG. 24 shows the reconstructed target tracks and sensor geometry. The Composite Hough Spaces produced by the ACHT are shown in FIGS. 25a through, 26j. The results of MCHT are not dramatically different from the ACHT and thus are not shown here.

The technique described herein, the Composite Hough Transform (CHT), is for multitarget-multisensor tracking and demonstrates the usefulness of CHT with real data sets from a shallow-water environment. Unlike Kalman-filter-based techniques, the CHT does not require an initial guess of the number and state of the targets, but can be applied to multitarget-multisensor tracking as long as the target maintains a constant course and speed.

By explicitly exploiting the geometric properties of multiple arrays, the CHT performs data fusion for multiple sensor arrays, resolves ambiguity due to the mirror effect and the delay curve parameter ambiguity associated with a single array, and allows one to reconstruct the target tracks. This technique enables one to do noncoherent integration from sweep to sweep, from delay-time-cell to delay-time-cell, and from array to array. By combining the energy from data across two spatially separated sensor arrays, the ACHT can theoretically provide an additional 3.0 dB processing gain over a single array. This technique can easily be extended to multiple arrays to further increase the processing gain and to facilitate sensor systems configuration and management.

Two versions of the Composite Hough Transform have been taught. The multiplicative form of CHT suppresses sidelobes more and thus can obtain a sharper peak and improve the accuracy of the parameter estimation. However, in low SNR cases (i.e., noise-limited condition), the performance of MCHT is the same as the ACHT. The CHT does not require a large number of calculations to search over the full space. Using the cued method to greatly reduce the size of search space can reduce this disadvantage.

The foregoing algorithm for an additive composite Hough transform is implemented utilizing the following flow chart diagrams shown in FIGS. 26 through 32. The computation process is started 165, as shown on FIG. 26, by reading in 167 the values of the following parameters:

(1) sweep duration
(2) dimension of correlograms
(3) file name of primary correlogram
(4) file name of secondary correlogram
(5) array configuration file
(6) the integrating thickness of correlation trace
(7) the peeling thickness of correlation trace
(8) maximum time delay of sensor array
(9) length of processed correlogram segment
(10) number of onion layers to peel

(11) searching range of target direction
(12) searching range target speed
(13) searching range of CPA distance
(14) searching range of CPA time
(15) output file name Next is read in the coordinates and orientation of primary array from the array configuration file 168, followed by reading in coordinates and orientation of secondary array from the array configuration file 172 from which the distance and relative orientation between the two arrays is calculated 174. Then, referring to FIG. 27, memory is allocated 176 for:

(1) primary correlogram
(2) secondary correlogram
(3) Hough space
(4) temporary buffers
(5) display buffers.

The mean and standard deviation of individual correlogram is then computed 178, the means are used for peeling the detected correlation traces. Following the assignment of a segment number index=1 is established 182, and answering the uiry establishing that the number "is the segment number index<its upper limit?" 274, from FIG. 32, the segment of primary and secondary correlograms is read in 184, followed by establishing an onion layer index=1 186 and answering the inquiry that the number is greater than the "onion layer index<its upper limit?" 268, FIG. 32, the speed index=its lower limit 188 is entered after confirming that the speed index is greater than its upper limit 262, FIG. 31. The speed of the target (V) based on speed index is computed 202.

Figure 28:
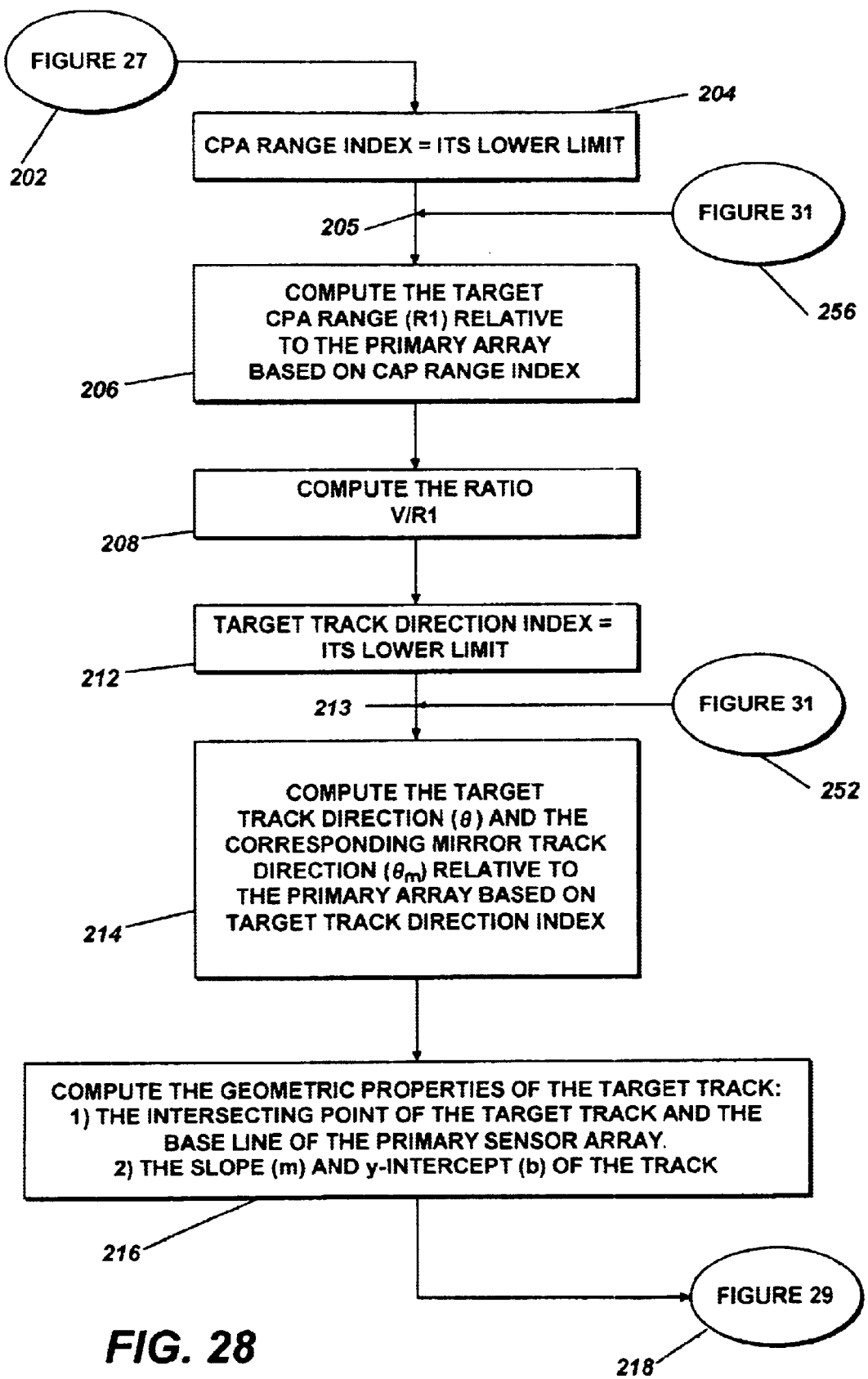
FIG. 28 shows a basic flow chart for an additive composite Hough transform.
Figure 31:
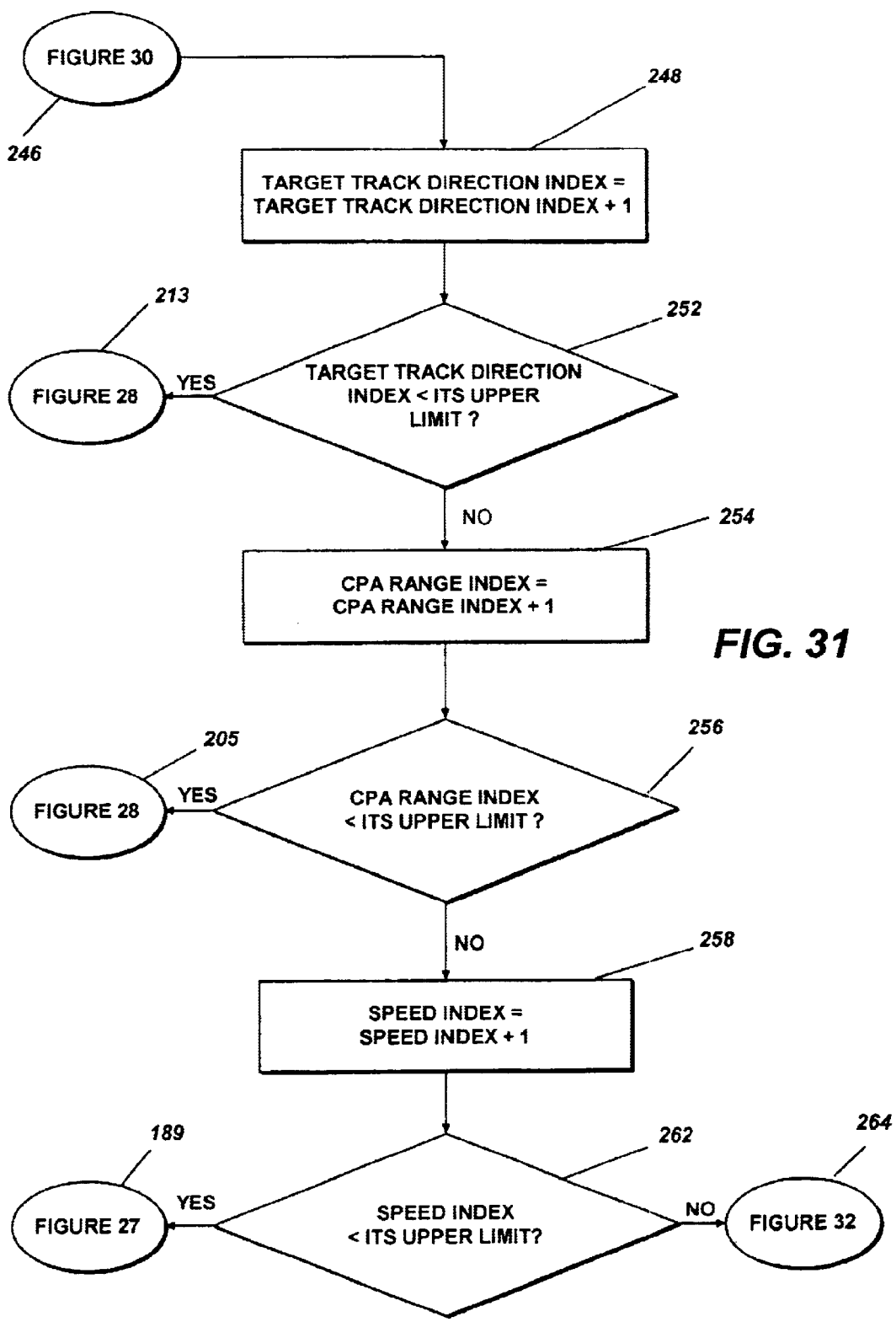
FIG. 31 shows a basic flow chart for an additive composite Hough transform.
Figure 32:
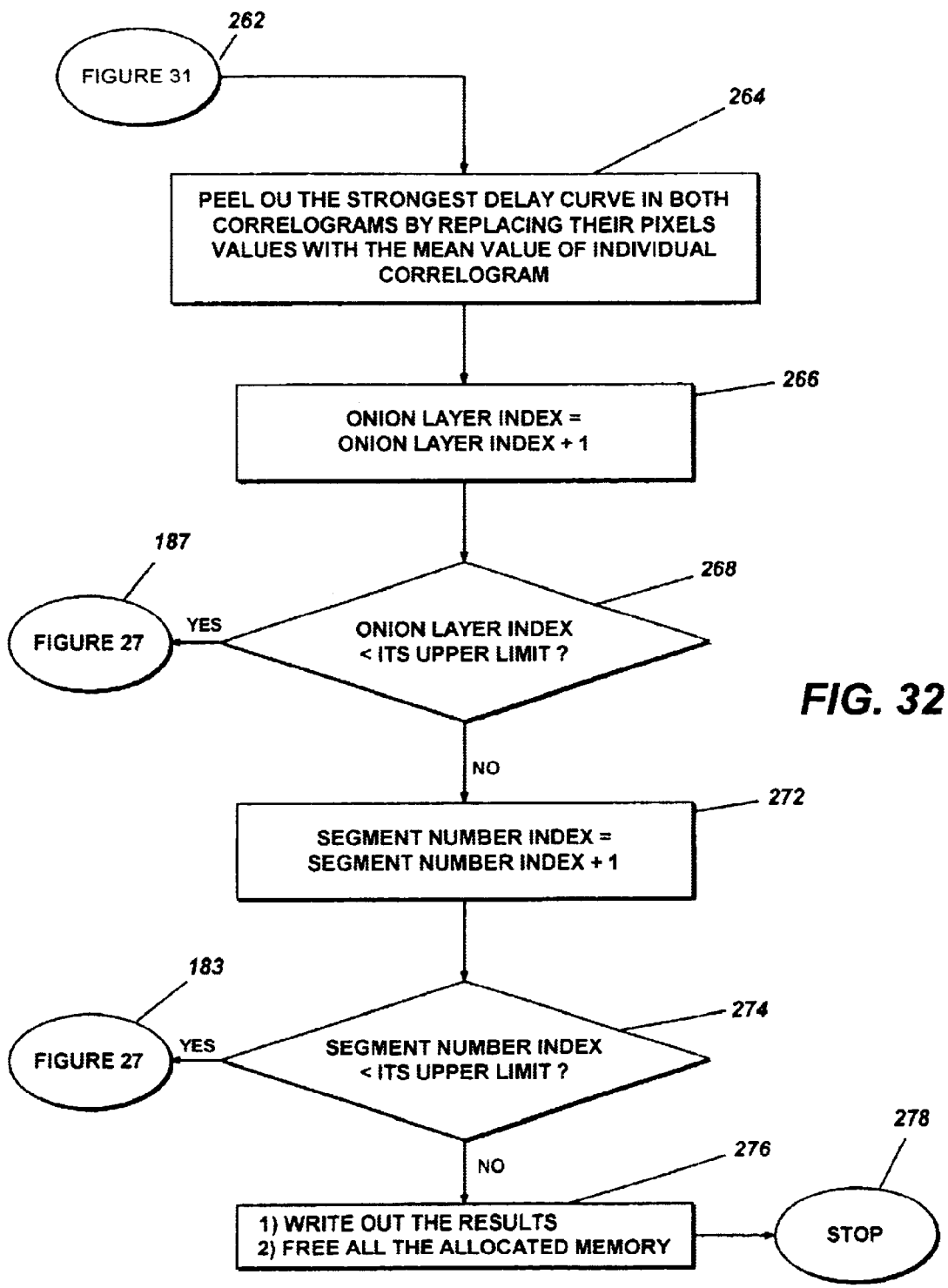
FIG. 32 shows a basic flow chart for an additive composite Hough transform.

Following the establishment of the CPA range index +its lower limit 204, shown on FIG. 28, after ascertaining that the "CPA range index<its upper limit?" 256, FIG. 31, the target CPA range ($R_1$) relative to the primary array based on CAP range index is calculated 206, as well as the computation of the ratio $V/R_1$ 208. The target trackdirection index=its lower limit is established 212 and when it is ascertained that the "target track direction index<its upper limit" 252, FIG. 31, the target direction ($\theta$) and the corresponding mirror track direction ($\theta_m$) relative to the primary array based on target track direction index 214 and the geometric properties of the target track: (1) the intersecting point of the target track and the base line of the primary sensor array; and (2) the slope (m) and y-intercept (b) of the track 216 are computed.

Figure 29:
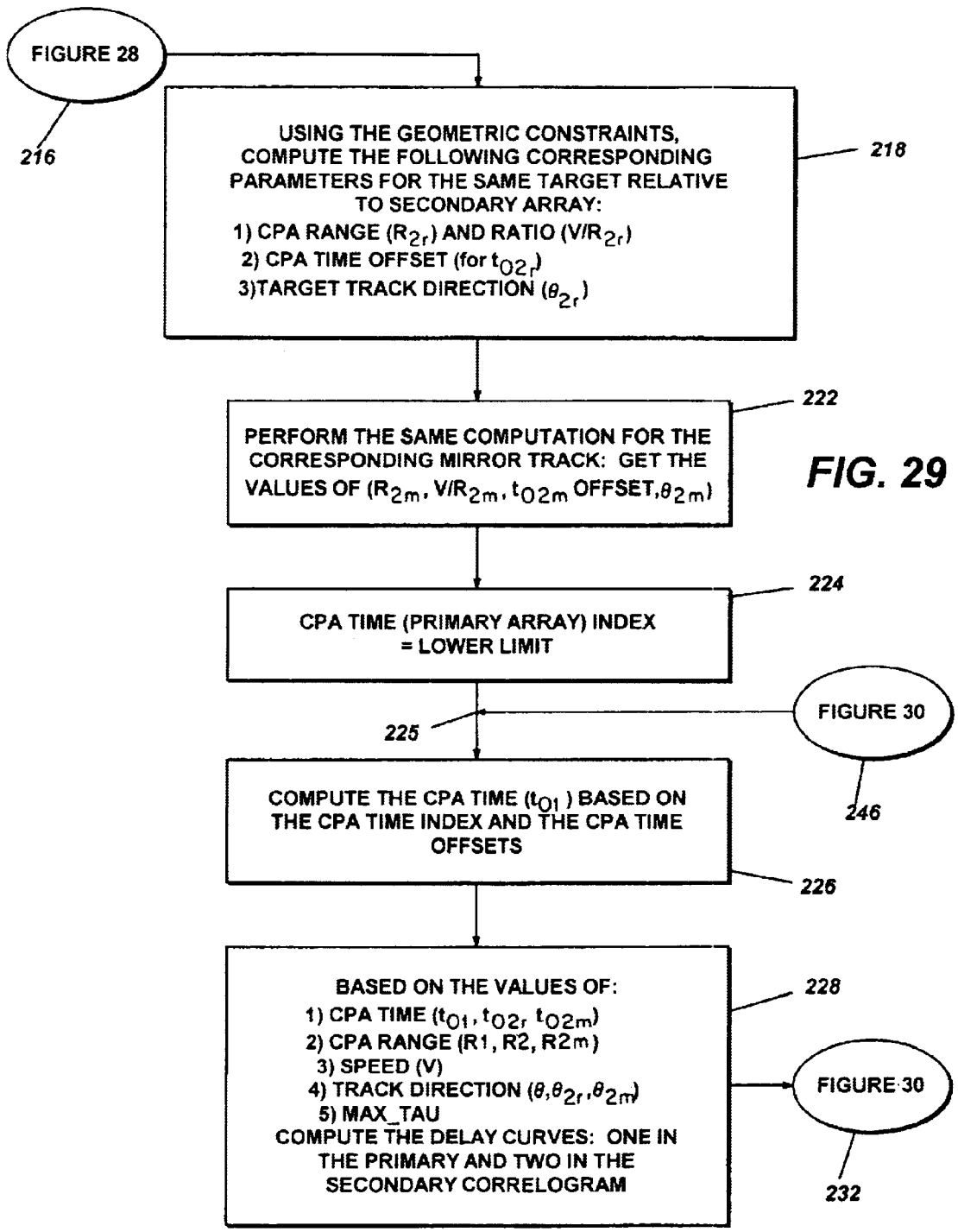
FIG. 29 shows a basic flow chart for an additive composite Hough transform.

Using the geometric constraints 218, FIG. 29, compute the following corresponding parameters for the same target relative to the secondary array (1) CPA range ($R_{2r}$) and ratio $V/R_{2r}$
(2) CPA time offset (for $t_{02r}$)
(3) TARGET TRACK DIRECTION ($\theta_{2R}$)

followed with the performance of the same computation for the corresponding mirror track 222, getting the values of ($R_{2m}$, $V/R_{2m}$, $t_{02m}$ offset, $\theta_{2m}$). The CPA time ($t_{01}$) based on the CPA time index and CPA time offsets are computed 226 after assigning a CPA time (primary array) index=lower limit 224 and verifying that the "CPA range index, its upper limit?" 256, FIG. 31. Based on the values of:

(1) CPA time ($t_{01}$, $t_{02r}$, $t_{02m}$)
(2) CPA range (R1, R2, $R2_m$)
(3) speed (V)
(4) track direction ($\theta$, $\theta_{2r}$, $\theta_{2m}$)
(5) max_tau compute the delay curves: one in the primary and two in the secondary correlogram.

Figure 30:
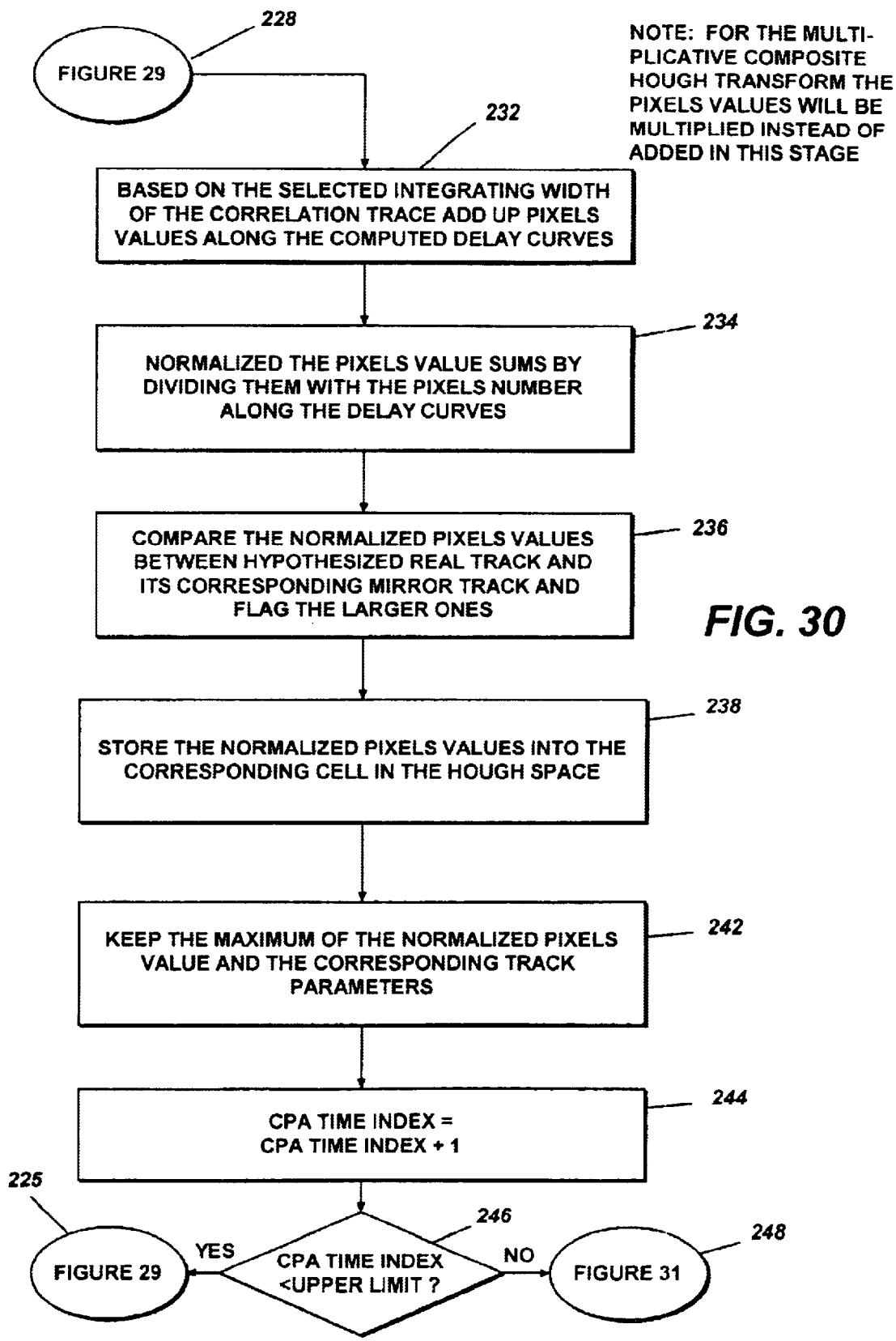
FIG. 30 shows a basic flow chart for an additive composite Hough transform.

Based on the selected integrating width of the correlation trace add up pixels values along the computed delay curves 232, FIG. 30 and normalize the pixels value sums by dividing them with the pixels numbers along the delay curves 234, It is noted that for multiplicative composite Hough transform the pixels values will be multiplied instead of added in this stage. The normalized pixels values between hypothesized real track and its corresponding mirror track are compared and the larger one is flagged 236, the normalized pixels values are then stored into the corresponding cell in the Hough space 238, keeping to a minimum the normalized pixels value and the corresponding track parameters 242. Aeries of indexes are established, such as (1) the CPA time index=CPA time index+1 is established 244 and if it is determined that the "CPA time index<upper limit?" is not met 246; (2) the target track direction index=target track direction index=1 248 is established, and it if it is determined that the "target track direction index<its upper limit?" is not met; then the CPA range index=CPA range index+1 is established and if it is determined that the "CPA range index<its upper limit?" 256 is not met; then a speed index= speed index+1 is established, and if "speed index<its upper limit?" 262 is not met; then you peel out the strongest delay curve in both correlograms by replacing their pixels values with the mean value of individual correlogram 264, FIG. 32. Again a series of indexes are established, (1) the onion layer index=onion layer index+1 266, which is tested to see if the "onion layer index<its upper limit?" is not met; (2) segment number index=segment number index+1 272 is established and tested to see if the "segment number index<its upper limit?" 274, if no; the results are written out and all allocated memory is freed 276; upon completion of which the program stops 278.

Although the invention has been described in relation to an exemplary embodiment thereof, it will be understood by those skilled in the art that still other variations and modifications can be affected in the preferred embodiment without detracting from the scope and spirit of the invention as described in the claims.

What is claimed:

1. A computer system for processing digitized data to determine the track of a target comprising:

a plurality of arrays of sensors for receiving signals from a target;

a receiver for receiving signals received by the plurality of sensor arrays;

a data storage device;

a computer for retrieving data from the data storage device and hypothesizing a track with track parameter values ($\theta$, v, D, $t_{01}$), where $\theta$ is reference track direction relative to east, v is target speed, D is the horizontal distance at CPA from a target to a sensor pair, and $t_{01}$ is CPA time of reference track;

generating a corresponding template delay curve in a primary correlogram;

performing integration along the template delay curve in the primary correlogram;

computing a delay curve parameter ($\theta_2$, v/D, $t_{02}$) for a secondary array based on geomtricconstraints involving said track parameter values, where $\theta_2$ is reference track direction relative to secondary array and $t_{02}$ is CPA time of reference track with respect to secondary array;

generating a corresponding template delay curve in a secondary correlogram based on the delay curve parameter ($\theta_2$, v/D, $t_{02}$);

performing integration along the template delay curve in the secondary correlogram and storing integrated values;

computing a delay curve parameter for a mirrored track ($\theta_{2m}$, $v/D_{2m}$, $t_{o2m}$) for the secondary array based on geometric constraints;

generating a corresponding template delay curve in the secondary correlogram;

combining the integrated values and storing it in, the corresponding composite Hough space; and thresholding accumulated pixel values to detect the track.

2. The system of claim 1, wherein the sensors for receiving signals from a target are acoustic sensors.

3. The system of claim 1, wherein the sensors for receiving signals from a target are electromagnetic sensors.

4. The system of claim 1, wherein the sensors for receiving signals from a target are optical sensors.

5. The system of claim 1, wherein the receiver is an acoustic receiver.

6. The system of claim 1, wherein the receiver is a solar signal receiver.

* * * * *

UNITED STATES PATENT AND TRADEMARK OFFICE
CERTIFICATE OF CORRECTION

PATENT NO. : 6,724,916 B1
DATED : April 20, 2004
INVENTOR(S) : Haw-Jye Shyu

It is certified that error appears in the above-identified patent and that said Letters Patent is hereby corrected as shown below:

<u>Title page,</u>
Item [56], References Cited, OTHER PUBLICATIONS, please add
-- SKLANSKY, J.; On the Hough Technique for Curve Detection; IEEE Trans. Computer vol. 27, No. 10, pp. 923-926; 1978. --

Signed and Sealed this

Sixteenth Day of November, 2004

JON W. DUDAS
*Director of the United States Patent and Trademark Office*